July 9, 1968 J. A. MAURER 3,391,495
METHOD AND APPARATUS FOR PRODUCING GEARS OF EXTREME ACCURACY
Original Filed Aug. 1, 1963 11 Sheets-Sheet 2

John A. Maurer INVENTOR.

BY
ATTORNEY

John A. Maurer
INVENTOR.

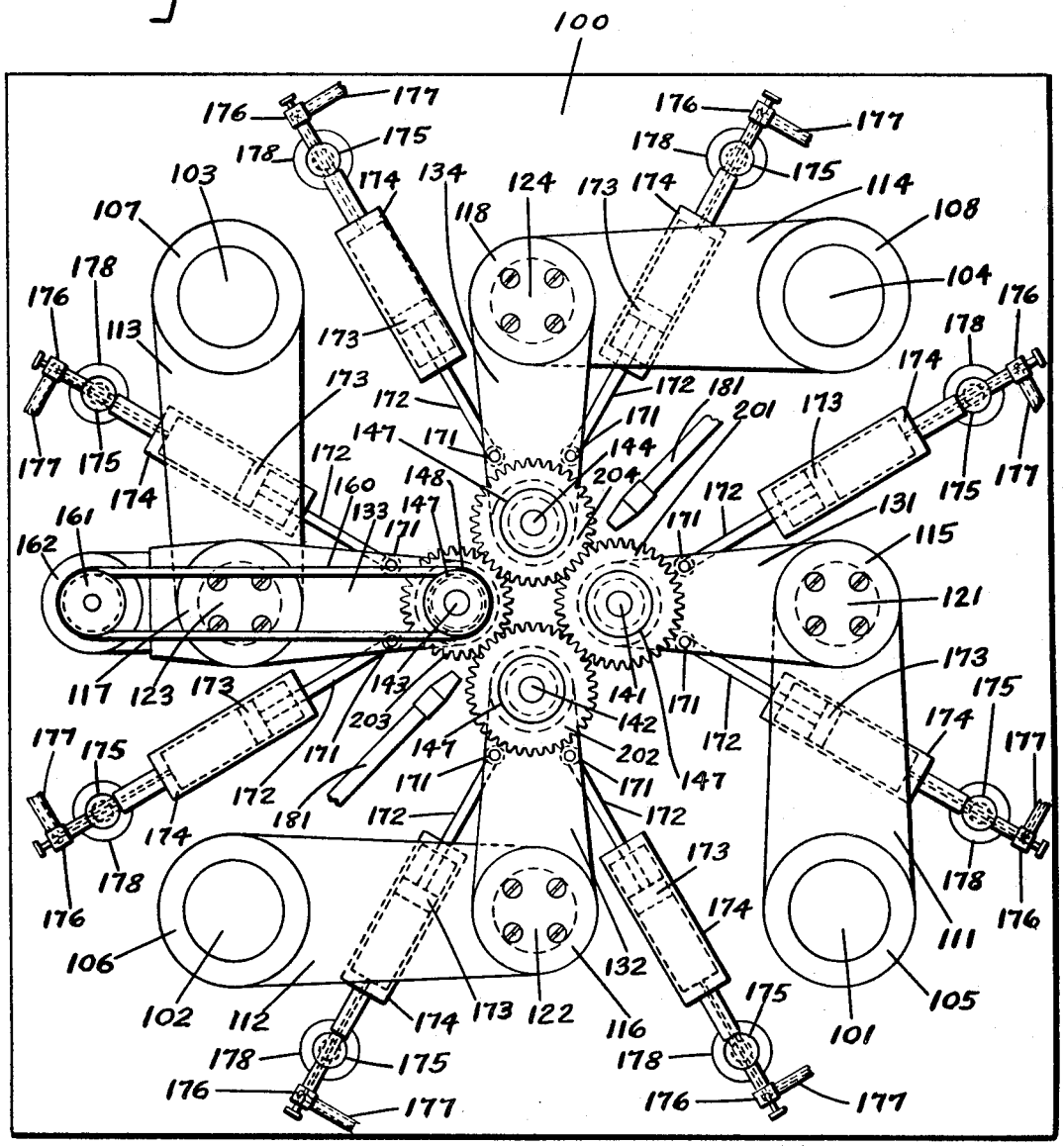

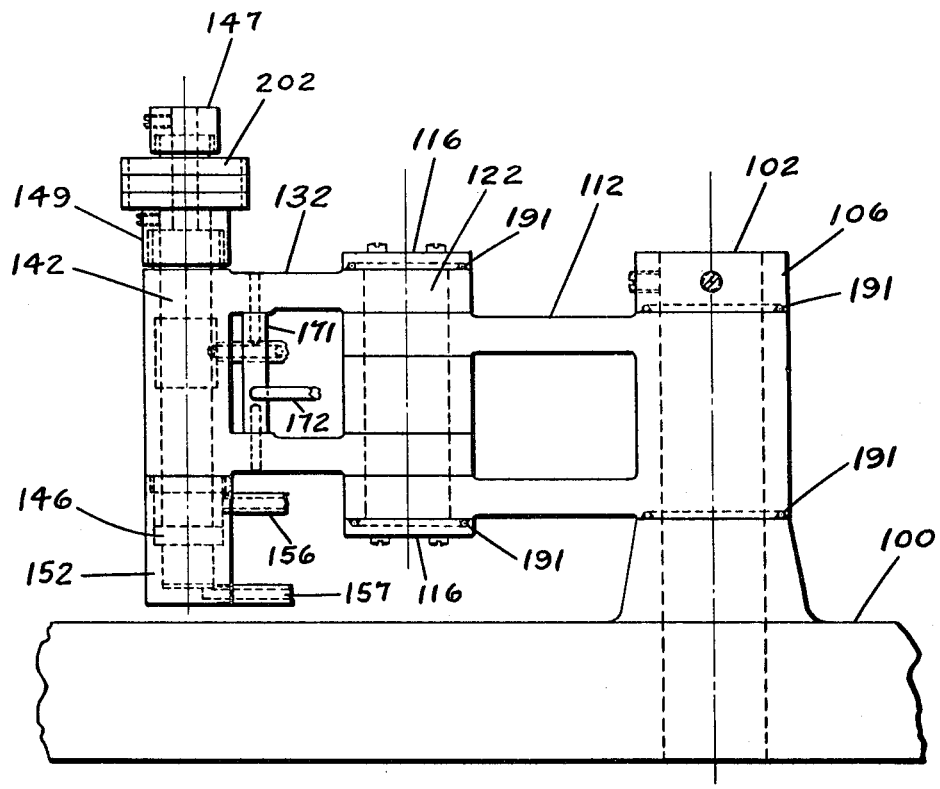

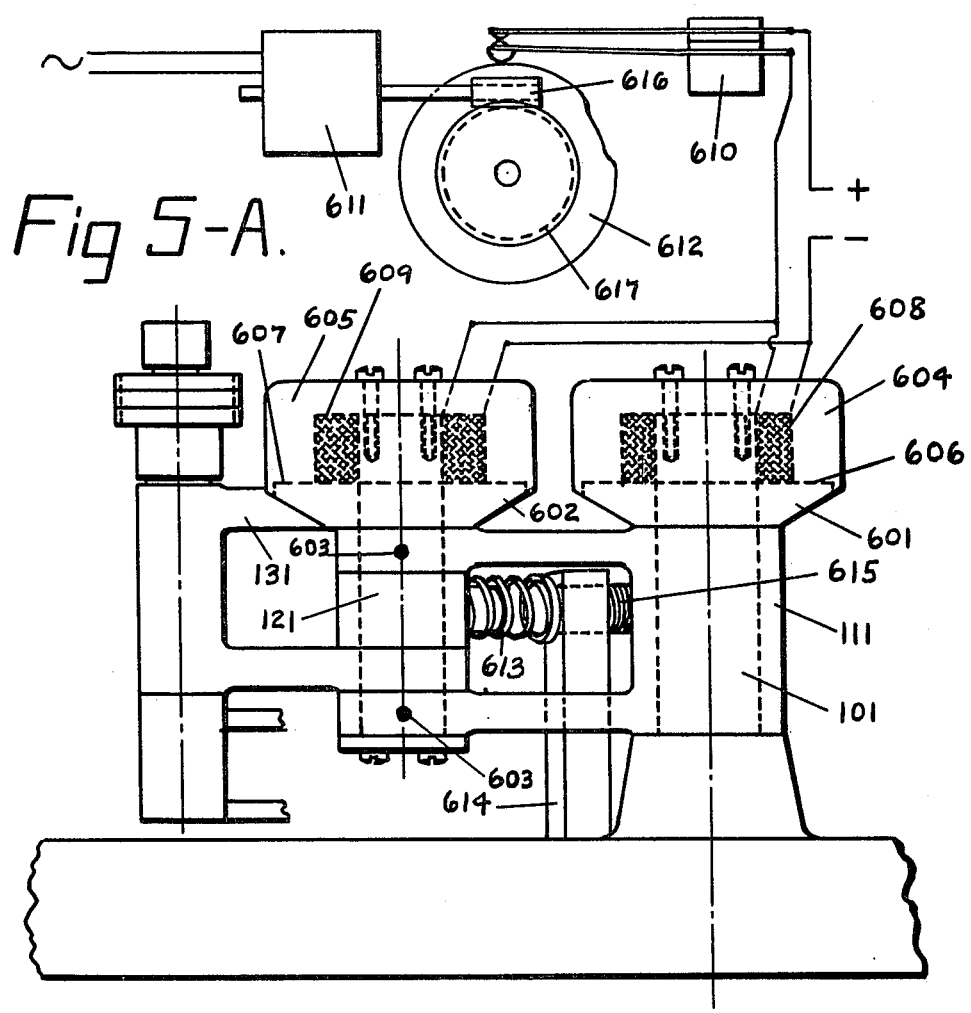

July 9, 1968 J. A. MAURER 3,391,495
METHOD AND APPARATUS FOR PRODUCING GEARS OF EXTREME ACCURACY
Original Filed Aug. 1, 1963 11 Sheets-Sheet 7
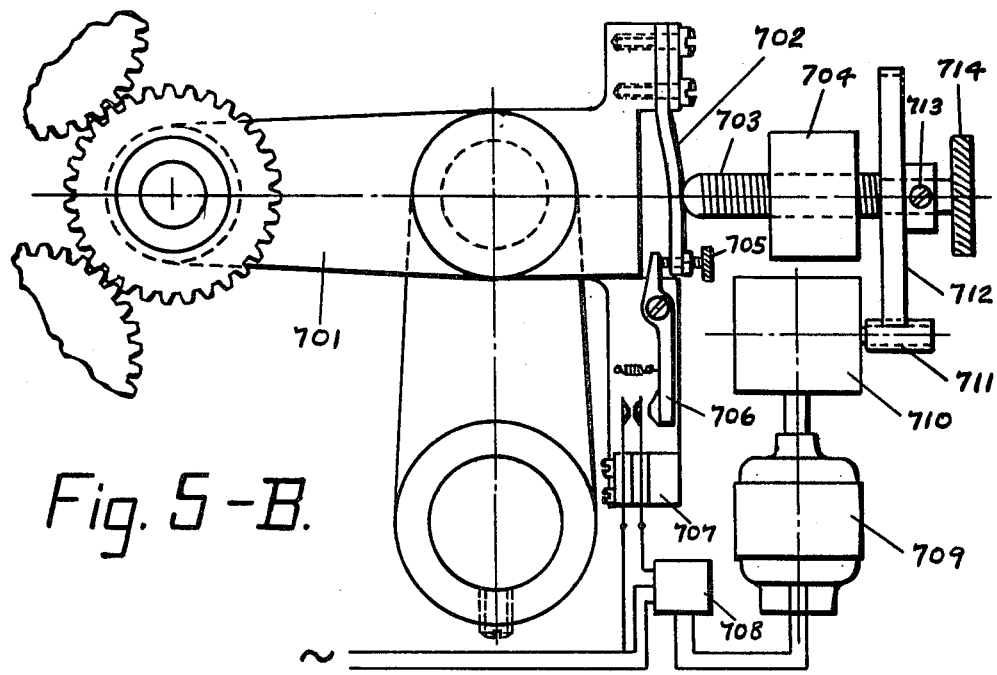
Fig. 5-B.
INVENTOR.
JOHN ANDREW MAURER
BY
ATTORNEY Fig. 6.
Fig. 7.
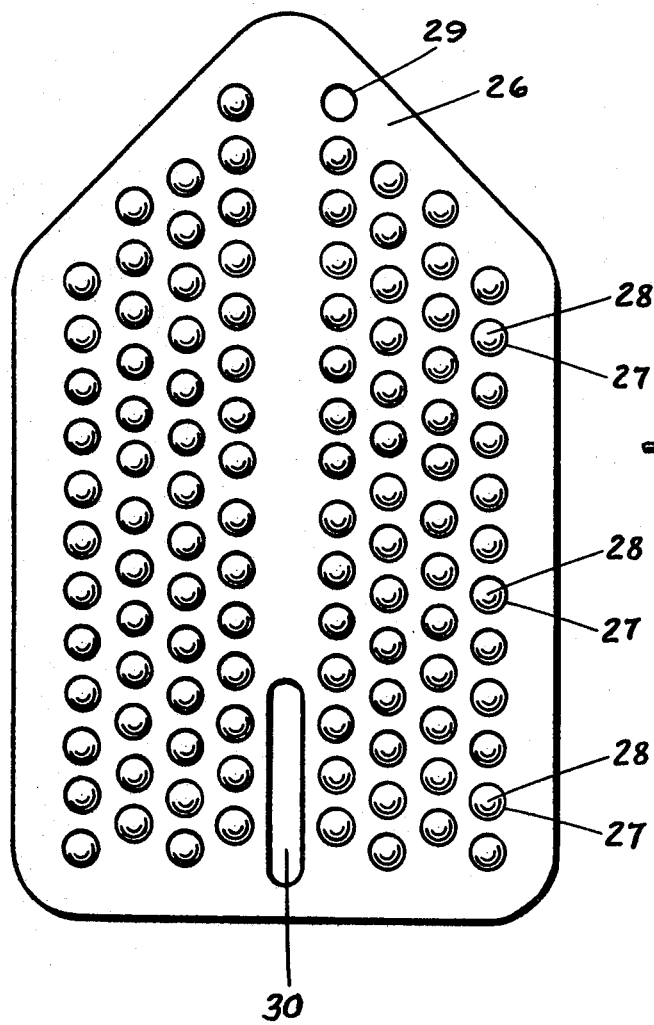
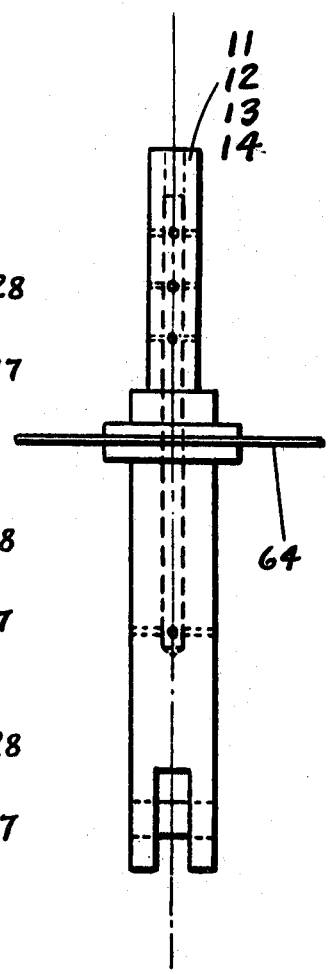
John A. Maurer INVENTOR.
BY
ATTORNEY July 9, 1968  J. A. MAURER  3,391,495
METHOD AND APPARATUS FOR PRODUCING GEARS OF EXTREME ACCURACY
Original Filed Aug. 1, 1963  11 Sheets-Sheet 9

John A. Maurer INVENTOR.

BY *[signature]*

ATTORNEY

July 9, 1968  J. A. MAURER  3,391,495
METHOD AND APPARATUS FOR PRODUCING GEARS OF EXTREME ACCURACY
Original Filed Aug. 1, 1963  11 Sheets-Sheet 10

John A. Maurer INVENTOR
BY
ATTORNEY

July 9, 1968   J. A. MAURER   3,391,495
METHOD AND APPARATUS FOR PRODUCING GEARS OF EXTREME ACCURACY
Original Filed Aug. 1, 1963   11 Sheets-Sheet 11

INVENTOR.
JOHN ANDREW MAURER
BY
ATTORNEY

United States Patent Office 3,391,495
Patented July 9, 1968

3,391,495
METHOD AND APPARATUS FOR PRODUCING
GEARS OF EXTREME ACCURACY
John A. Maurer, 154 Demott Lane,
Somerset, N.J. 08873
Continuation of application Ser. No. 299,341, Aug. 1,
1963. This application Oct. 3, 1966, Ser. No. 600,291
20 Claims. (Cl. 51—26)

ABSTRACT OF THE DISCLOSURE

The invention is directed to a mechanism for cold-shaping gear teeth by mounting the gears upon shafts whose axes are in generally spaced parallel relationship to each other. Means are provided for imparting movement to at least three of the shafts individually and independently of each other in directions normal to the shaft axes during which time the gears are rotated causing the cold-shaping of the teeth thereof virtually absent errors in tooth-spacing, tooth-form and eccentricity. Means are also provided for adjusting the force exerting means to selectively apply a desired force to the meshed gears through each of the shafts individually.

---

This is a continuation of applicant's copending application Ser. No. 299,341 filed on Aug. 1, 1963, and now abandoned.

This invention relates to the art of producing toothed gears, and specifically to the production of straight spur and helical gears in which the pitch lines of the teeth lie on right circular cylinders. The invention consists of a novel method and apparatus which may be employed in four somewhat different but closely related ways.

In the first mode of employment of the invention gears which have been formed by the methods of the prior art and which have intentionally been made slightly larger than the standard diameters are subjected to a lapping process which progressively reduces their errors of tooth spacing, eccentricity, and tooth-shape, with the result that when their diameters have been brought down to the desired final values, these errors of tooth-spacing, eccentricity, and tooth-shape have been so far reduced that they are negligible or even so small that they cannot be measured.

In the second mode of employment of the invention gears made of hardened tool steel or other hard material are made very nearly perfect by the above-mentioned lapping procedure and are gashed or channeled so that they are provided with sharp cutting edges; they are then employed in the same apparatus and by the same basic process to act as shaving cutters which bring gears made of softer materials to a close approach to perfection much more rapidly than can be done by the relatively slow process of lapping.

In the third mode of employment of the invention, shaving cutters made as just described may be employed in the same apparatus to generate extremely accurate gears in a new way from blanks that have been prepared only by turning them to the proper outside diameters.

In the fourth mode of employment of my invention, gears made of hardened tool steel or other hard material which have been made nearly perfect by the above-mentioned lapping procedure are employed to burnish gears made of softer materials. When a gear is burnished by the method and apparatus of my invention, its errors of tooth-spacing are reduced in a way that is not accomplished by the burnishing processes of the prior art.

When gears are produced by the methods of the prior art, high accuracy with respect to uniform tooth-spacing, concentricity, and exact involute tooth-shape can be obtained only by the use of extremely accurate machines and cutting tools. As the machines and tools are used, the effect of wear is to make the gears that are produced less and less accurate.

In either a gear-hobber or a gear-shaper the gear-blank and the cutter are moved with respect to each other so that first the cutter produces notches in the blank and then by repeated action these notches are deepened until the gear-teeth have been formed to the correct depth. This process generates teeth that are of approximately the desired shape, but since it is necessary in practice to feed the cutter fast enough to enable it to remove a clean chip at each cut, the tooth form that is produced is made up of a series of small flat or curved steps which are tangent to the theoretically correct involute surface. The effect of this imperfection of tooth-shape is to generate vibration and noise when such gears are employed to transmit power.

The spacing of the teeth on a new gear produced by hobbing or shaping is controlled by a train of gears which governs the relative motions of the gear blank and the cutter. One of these gears, the "master" gear, is on the shaft which supports and rotates the gear blank; this gear is usually made to rotate by the action of a worm. Another gear is on the shaft that supports and rotates the cutter. The gears that connect the cutter actuating gear with the worm are called "change" gears. They are supplied in sets from which many combinations may be made to cause the machine to produce gears having different numbers of teeth. Any inaccuracies of spacing in the teeth of the master gear or the change gears produce corresponding inaccuracies in the spacing of the teeth of the new gears that are cut.

The gear blank in a gear-hobber or shaper is mounted on an "arbor" or shaft or in a collet which must run true within narrow limits. If this condition is not satisfied, the gear that is produced is eccentric with respect to its center hole or shaft. If the bearings of the machine have appreciable looseness, the teeth of the new gear are not located on a true circular cylindrical surface.

In actual practice, the best available gear-hobbers and gear-shapers do not produce gears that are sensibly perfect. In every case there are errors of tooth spacing, tooth-shape, and eccentricity that are great enough to make a gear train noisy if it is operated with the gears in tight mesh at even moderately high speeds.

Another method of producing gears that is sometimes used in the prior art is to cut or grind the teeth, one at a time, with a formed cutter or grinding wheel, the gear being mounted on a dividing head by which it is rotated step by step until all the teeth have been cut. When a gear is made in this way, any inaccuracies of spacing that exist in the main gear of the dividing head or in the index plates and auxiliary gears used with it are transferred to the gear being cut, so that the spacing of its teeth is always measurably irregular.

When gears are produced in this way by the use of a formed cutter or grinding wheel, no generating process takes place, and the form of the gear-tooth is determined by the form of the cutter. Since the involute curve is a difficult one to produce in a cutting edge, such gears generally have readily observable departures from the desired tooth-shapes.

In the prior art, processes known as gear-lapping, gear-shaving, and gear-burnishing are sometimes employed to improve the accuracy of gears after their teeth have been cut, the primary object being improvement of the smoothness of running of trains made up of these gears. In these processes what may be termed "master" gears that have been made with special care and greater than usual accuracy are caused to impart some degree of their superior accuracy to new gears that have been made by hobbing or shaping. In some cases the gear that is to be improved is placed in mesh with three or four of these more than usually accurate gears in order to obtain a balance of the pressures that are exerted on the shaft which carries the gear that is undergoing the lapping, shaving, or burnishing treatment. This procedure also increases the number of accurate teeth that act on the new gear so that its teeth are smoothed more rapidly than can be done by the action of a single highly accurate gear.

These prior art methods and apparatuses of improving the accuracy of previously cut gears differ from the method and apparatus of my invention in three important ways. First, in all of these processes, the gears of higher than usual accuracy impart some of their superior accuracy to the new gears and in so doing are themselves worn and thereby rendered less accurate, so that after a certain number of new gears have been operated upon, it is necessary to replace the highly accurate gears. By contradistinction the gears used in the method and apparatus of my invention act upon each other in such a way that the accuracy of all the gears is continuously improved. Second, the gears used in the prior art as lapping masters, shavers, or burnishers are operated in mesh with the gear that is to be improved, but when several such gears are employed, these gears are not in mesh with each other or with any other gears connecting them. In the method and apparatus of my invention, each gear is placed in mesh with two or more others in such a way that the gears that take part in the process form a closed train. Third, the lapping, shaving, and burnishing processes of the prior art improve the accuracy of tooth form and the concentricity of the new gears, but these processes have little effect on errors of tooth-spacing, whereas my invention provides an effective way of removing these errors of tooth-spacing at the same time that errors of tooth-form and of concentricity are corrected.

From the above discussion it may readily be understood that production of highly accurate gears by the methods of the prior art requires accuracy approaching the limits of what is possible in machine tool and cutter fabrication. By these methods it is extremely difficult to produce gears that have cumulative errors smaller than several ten-thousandths of an inch. The existence of these errors makes it necessary to operate gear trains with a certain amount of looseness or "backlash," which is undesirable in applications in which motion must be transferred accurately from one location to another.

By contradistinction, the accuracy required in the construction of the apparatus used to carry out the method of my invention is accuracy only of kinds readily obtainable by well-known machine-shop operations, while by the use of this apparatus and method, gears are produced of such extreme accuracy that if trains made up of them are enclosed and kept free from dust and dirt, they may be operated in continuous tight mesh without producing vibration or noise.

The major object of my invention is to provide a method and apparatus which make it possible to produce circular spur or helical gears that have errors of tooth-spacing, of eccentricity, and of tooth-form, very much smaller than the smallest errors of these kinds attainable in practice by the methods of the prior art.

It is an object of my invention to provide means by which gears of a superior standard of accuracy may be produced economically in quantity.

It is an object of my invention to provide gears which can be used in trains to transmit motion from one place to another with improved accuracy.

It is an object of my invention to provide gears that can be used in tight mesh with each other without encountering the disadvantages of noise and uneven resistance to the driving force that are experienced when gears made by the methods of the prior art must be operated lightly meshed.

Another object of my invention is to produce gears of such accuracy that they may be used for the precise measurement of angles without the use of auxiliary correction devices, such as the correction cams now used in dividing heads and rotary tables whenever the highest standard of accuracy is required.

Another object of my invention is to improve the accuracy of existing gear cutting machines such as gear-hobbers, gear-shapers, and bevel and hypoid gear generators, by providing master gears and change gears of improved accuracy for use in these machines.

By the methods of the prior art it is difficult to produce gears having large prime numbers of teeth. In order to cut a gear having a prime number of teeth on a hobbing machine, gear-shaper, or dividing-head, it is necessary to have a change-gear or index-plate having the same prime number of teeth or divisions or a multiple thereof. Customarily such gears and index-plates are provided for the smaller prime numbers up to 127. If a gear having some larger prime number of teeth is to be made, it is necessary to produce a new change-gear or index-plate by resorting to the fundamental method of dividing the circle into the required number of parts by exact measurement. This process is so laborious that it is seldom carried out, even though numerous applications exist in which gears having moderately large prime numbers of teeth would be useful.

My invention provides a means by which a gear having any number of teeth within the diametral capacity of the machine may be generated without the use of an auxiliary or change-gear having this number of teeth. Accordingly, it is an object of my invention to provide a convenient means of producing gears having prime numbers of teeth.

Still another object of my invention is to provide an improved method and apparatus of gear burnishing by which errors of tooth-spacing as well as errors of tooth-form in the gears being burnished may be corrected rapidly and efficiently.

Other objects of the invention will become apparent from the following description, which should be taken in connection with the several figures of the drawing, in which:

FIGURE 4 is a top view looking downward at a different illustrative machine embodying my invention, also with four gears shown mounted thereon;

FIGURE 5 is a view in elevation showing the construction of one of the gear mounting units of the machine of FIGURE 4;

FIGURE 5A is an elevational view, and illustrates an alternative embodiment of the gear mounting unit of FIGURE 4;

FIGURE 5B is a view looking downward on one of the gear mounting units of FIGURE 5, and illustrates alternative means for controlling the tightness of mesh of the gears;

FIGURE 6 is a view showing the construction of an intermediate support of which three are used in the type of machine shown in FIGURE 1;

FIGURE 7 shows a gear-supporting shaft as used in the machine of FIGURE 1, and shows particularly a construction by which oil under pressure may be introduced in order to insure the smooth operation of a very tightly fitted bearing by which the gear rotates on the upper part of this shaft;

Figure 1:
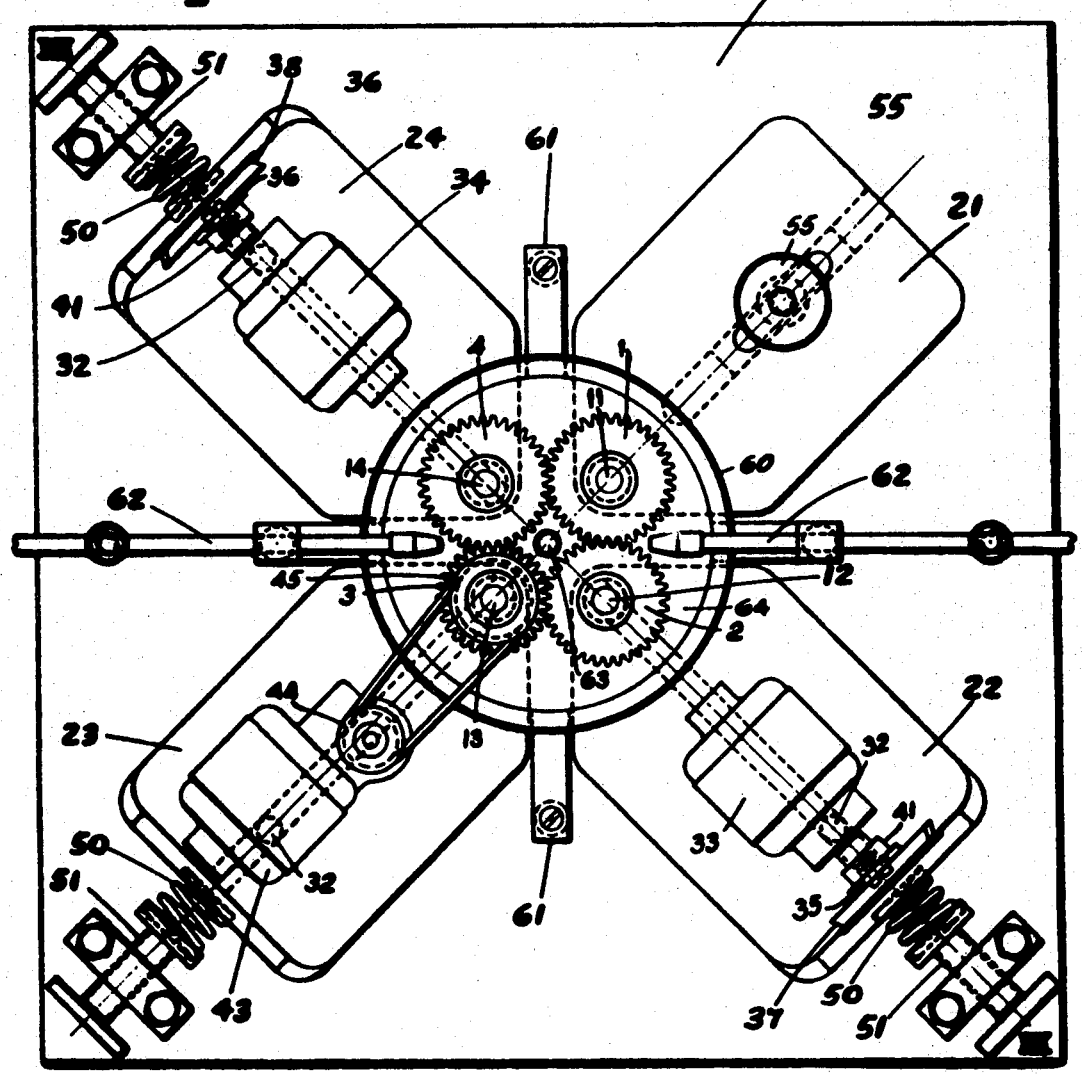
FIGURE 1 shows a top view looking downward at a machine having four gears mounted on it, embodying my invention.
Figure 2:
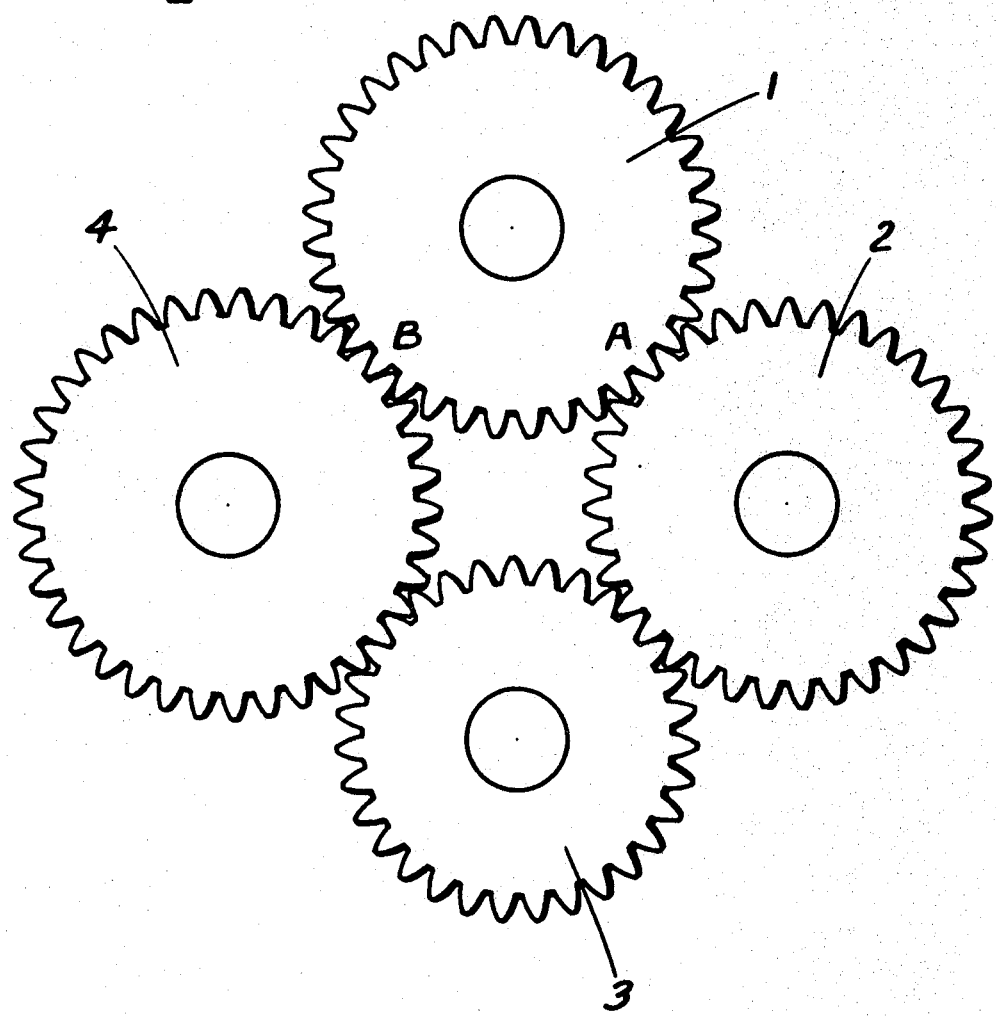
FIGURE 2 is a view showing four gears in mesh with each other to form a closed train.

The basic priciple of my invention can be most easily understood from a consideration of FIGURE 2 taken in conjunction with either FIGURE 1 or FIGURE 4. Four is the smallest number of gears that can be meshed with each other to form a closed train in which the gears can rotate. If four gears are meshed as shown in FIGURE 2, each gear being in mesh with two of the others, and if one of the gears is made to rotate, the two gears that are in mesh with it rotate in the opposite sense, and the fourth gear rotates in the same sense as the gear that is driven.

Obviously the gears used to form the closed train must have the same diametral pitch and pressure angle, and in the case of helical gears they must also have the same helix angle.

In accordance with my invention, a gear which is to be made very accurate is mounted with three other gears, preferably having different numbers of teeth, to form a closed train as shown in FIGURE 2, FIGURE 1 and FIGURE 4. The numbers of teeth on the three auxiliary gears may be chosen advantageously in relation to the number of teeth on the first gear in a manner that will be described, which insures that, as the gears rotate, every tooth of each gear will make contact in a regularly progressive manner with every tooth of each of the two gears with which it meshes. This insures that during a sufficiently large number of revolutions of the first gear, the four gears of the train will pass through every possible angular relationship to each other and that these angular relationships will be repeated at regular intervals, no one angular relationship occurring more often than any of the others.

If the gears have the correct pitch diameters and correct tooth-forms, and if all of them have sensibly uniform tooth-spacing, they can be meshed tightly in the manner shown in FIGURE 2, in which, if we concentrate our attention on gear No. 1, for example, both faces of each of those teeth which are in mesh in the region at "A" with the teeth of gear No. 2 are in equally close contact with the mating teeth of gear No. 2 and at the same time both faces of each of those teeth which are in mesh in the region "B" with the teeth of gear No. 4 are in equally close contact with the mating teeth of gear No. 4. The same statements may be made with respect to the teeth of each of the other three gears as they relate to the teeth of the gears with which they are in mesh.

Now, for the sake of discussion, let us assume that the axes of rotation of all of the gears are fixed in the positions determined by the condition of mesh shown in FIGURE 2 in which all of the gears are assumed to have uniform tooth-spacing, but that we put in place of the original gear No. 1 a gear the teeth of which are unevenly spaced, being too close together on one side of the gear and too far apart on the other side. It is evident that in order to be able to insert this gear into the train we must turn it into a position in which some of the teeth in the arc that extends from "A" to "B" are too close together and some are too far apart, so that over this arc of the gear these tooth-spaces add to the same total distance as the same number of spaces on a perfect gear.

If, in this situation, we attempt to rotate the gears of the train in a direction such that a group of those teeth of gear No. 1 which are too far apart will be brought into the space between "A" and "B", we shall develop a pressure tending to push gears No. 2 and No. 4 farther apart. Conversely, if we attempt to rotate the gears of the train in the opposite direction, which would bring into the space between "A" and "B" a group of those teeth of gear No. 1 which are too close together, we shall develop a pressure tending to pull gear No. 2 and gear No. 4 closer together. In either case, if the departures from uniformity of spacing are appreciable, we shall encounter great resistance in attempting to rotate the gears.

In most practical cases we can, by the application of rotational forces that are not great enough to damage the gears, compel them to rotate while the differences between the average and maximum and minimum spacings of the teeth of gear No. 1 are accommodated by elastic deformations of all of the gears and of their supports. The significant point is that whenever a group of widely spaced teeth is between "A" and "B", those teeth of gear No. 1 which are in mesh at "A" and "B" have much heavier pressures on the sides which are turned away from the arc "A"–"B" than on the sides that are toward the arc "A"–"B", and conversely whenever a group of closely spaced teeth is between "A" and "B", the teeth of gear No. 1 at "A" and "B" are subjected to much heavier pressures on their sides which are toward the arc "A"–"B". These are the relationships that exist if three of the gears, No. 2, No. 3 and No. 4 are substantially perfect.

If, however, all four of the gears have been made by the methods of the prior art and, therefore, have inequalities of tooth-spacing, we see that some, and in fact many, angular relationships of the four gears exist in which the arcs that are turned toward the center of the figure have, on all four gears, on their averages, too wide tooth-spacing, so that when all the gears are in tight mesh with each other, pressures exist which tend to drive the four axes of rotation farther apart than those of perfect gears would be, and we see also that some, and in fact many, other angular relationships exist in which those arcs that are turned toward the center of the figure have, on their averages, too narrow tooth-spacing so that forces are set up between the teeth which tend to pull the gears closer together.

What has just been stated can be expressed in another way, and with greater generality, as follows: A closed train made up of an even number of gears tightly meshed on fixed axes of rotation can run without interferences only if at all times the total of all the tooth-spaces making up the arcs from mesh to mesh on the inwardly turned sides of the gears of the train is equal to a constant. This can be true only in two ways, first, if all the gears of the train have equally spaced teeth, or, second, if two or more of the gears are related in such a way that their inequalities of tooth-spacing constantly cancel. It is possible to have the latter type of relationship if two of the gears have the same number of teeth, or if the number of teeth on one is a multiple of the number on another. In general, however, a closed train of gears can run smoothly only if all the gears are perfect with respect to uniformity of tooth-spacing.

Closed trains made up of odd numbers of gears are, of course, of no practical interest because the gears in them cannot rotate.

Figure 11:
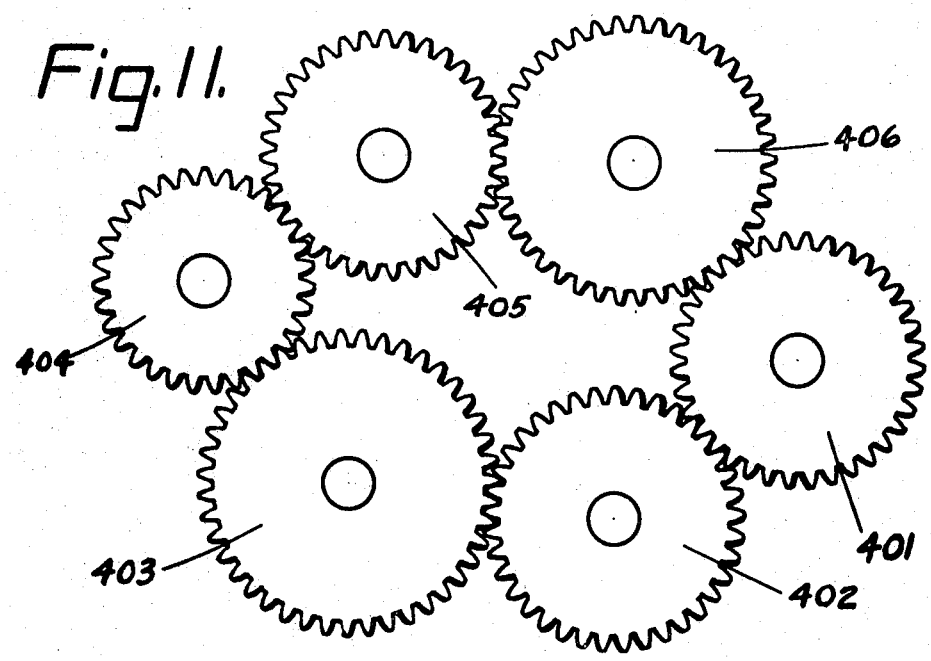
FIGURE 11 is a drawing of six gears meshed with each other to form a closed train to illustrate the fact that the basic method of my invention is not limited to the use of four gears, but can also be applied by the use of larger even numbers of gears.

In FIGURE 11 I have shown a closed train of six gears. In this drawing it can readily be seen that if these gears are tightly meshed and if the axes of rotation of all the gears are fixed, and if we make the assumption that gears 402, 403, 404, 405 and 406 have uniform tooth-spacing, precisely the same statements can be made with regarding the behavior of the system with an imperfect gear in the position 401 as were made above with reference to the behavior of the gear train shown in FIGURE 2 with an imperfect gear in position 1. Furthermore, it can readily be seen that the statements made above about the behavior of a closed train of four gears all of which are imperfect may be applied equally well to a train of six gears all of which are imperfect, or to trains of eight or even more gears made by inserting additional pairs of gears into the train shown in FIGURE 11.

While a closed train of six or more gears such as is shown in FIGURE 11 can be used to carry out my invention, it will readily be seen that as a practical matter the best arrangement is the one using four gears.

Referring again to FIGURE 2 and again assuming that gears Nos. 2, 3 and 4 have uniform tooth-spacing, it may be seen that if the teeth of gear No. 2 and gear No. 4 are enabled to lap down or to shave the teeth of gear No. 1, then, because the removal of material is increased by pressure, the lapping or shaving of material from the teeth of gear No. 1 will be such as to reduce the existing inequalities of spacing by bringing the centers of the teeth that are too far apart closer together and by moving the centers of the teeth that are too close together further apart. After a short time, this process will result in the gear train running with some looseness. If the axes of the gears are then moved inward until a tightly meshed condition is again encountered and the lapping or shaving process is continued, the teeth of gear No. 1 will be further corrected. By alternately establishing a condition of tight mesh, and then rotating the gears and allowing the tight places to be lapped or shaved away, proceeding necessarily in very small steps, a condition will ultimately be reached in which the tooth-spacings of gear No. 1 have been made uniform and further lapping or shaving will only remove material uniformly all around that gear. This comes about because, whenever an arc of the circumference of gear No. 1 on which the average tooth-spacing is too large comes between the positions "A" and "B" of mesh with gears Nos. 2 and 4, the outside curved surfaces of the teeth at the ends of the arc are cut, or lapped away, and whenever an arc on which the average tooth-spacing is too small comes into the same position, the inside curved surfaces of the teeth at the ends of the arc are cut or lapped away, and as the gears are gradually moved closer together, this correcting action eventually extends all the way around gear No. 1, so that all the tooth-spacings that originally departed from the desired average have been corrected.

It is obvious that this correcting action will take place if gears Nos. 2, 3 and 4 initially have perfectly uniform tooth-spacing. It is less obvious that the same type of correcting action can be made to take place if all four of the gears are originally imperfect. In order to make this clear, it is necessary at this point to consider the desirable relations of the numbers of teeth on the three "auxiliary" gears (Nos. 2, 3 and 4) to the number of teeth on gear No. 1, considering gear No. 1 to be the "desired" gear.

The object of making a special selection of the numbers of teeth on the three auxiliary gears is, as before stated, to create a situation in which, as the gears rotate, they will pass progressively through many, and preferably all possible angular relationships to each other, and that none of these angular relationships will be repeated any more often than all the others.

The governing principle is that the numbers of the teeth on the four gears should not have any common factors other than unity. If the desired gear has an even number of teeth, the simplest way of accomplishing this is to begin by giving one of the gears a number of teeth one lower than the number on the desired gear and to another a number of teeth one higher. Both of these gears will then have odd numbers of teeth, and since two odd numbers which differ by two have no common factors other than unity, the above condition is satisfied as far as these three gears are concerned. The fourth gear may then be made to have a prime number of teeth, preferably either the nearest prime number counting upward from the number of teeth on the desired (No. 1) gear or the nearest prime number counting downward from that number. However, any reasonably near prime number may be used.

It is desirable to have the four gears as nearly as possible of the same diameter in order that their diameters will be reduced by the lapping process at nearly the same rates.

As an example of this method of choice, we may take the gears actually drawn in the figures, in which gear No. 1, the "desired" gear, has 36 teeth; gear No. 2 has 35 teeth; gear No. 3 has 31 teeth; and gear No. 4 has 37 teeth. Alternatively, gear No. 3 might have 41 teeth. The prime factors of 36 are 3, 3, 2 and 2; the prime factors of 35 are 5 and 7; the next higher number, 37, happens to be a prime number, and 31 is the next lower prime number; 41 is the next prime number higher than 37. Thus, in either of the numerical sets, 36, 35, 37 and 31, or 36, 35, 37 and 41, there are no common factors other than unity.

In many cases, and especially when dealing with numbers larger than are found in the above examples, we have the option of choosing for the fourth gear a number that is not a prime number but which, nevertheless, does not have any factors in common with the numbers used for the other three gears.

If the desired gear has an odd number of teeth, such as 41, we may begin by assigning to one of the other gears the number that is lower by two and to another the number that is higher by two; in this example 39 (3 times 13) and 43. 43 happens to be a prime number, but even if it were not, it is true as a general statement that two odd numbers which differ by 4 have no common factors other than 1; therefore, three numbers chosen in this way will have no common factors. As the number of teeth for the fourth gear, we might take the next lower prime number, 37, or the next prime number higher than 43, which is 47, but in this case we also have available the numbers 38 (2 times 19), 40 (2 times 2 times 2 times 5) and 44 (2 times 2 times 11), none of which have any factors in common with 39, 41 or 43. Any of these numbers satisfies well the condition that the four gears should not differ greatly in size.

In every case, whether the desired gear has an even number of teeth or an odd number suitable choices for the numbers of teeth on the auxiliary gears are available.

If we have two gears in mesh having numbers of teeth that have no common factors, and if while the gears are standing still we mark for reference a tooth on one of the gears on or near the line joining the centers of the two gears, and also mark for reference the space on the other gear into which the first tooth is meshed, and if we then rotate the two gears, we find that at the end of every rotation of the first gear the tooth marked for reference is engaged in a different space on the second gear until finally the first gear has been rotated as many times as there are teeth on the second gear. At this point the marked tooth will have been engaged with every space on the second gear, and it will be found again in mesh with the marked space on the second gear, so that the cycle begins again.

If we have chosen the four gears to form the closed system shown in FIGURES 1, 2 and 4 so that their numbers of teeth have no common factors, the fourfold combination of individual teeth and spaces originally in mesh will not be repeated until any gear we take as our reference, most conveniently the "desired" gear, has been rotated as many times as the product of the numbers of teeth on the other three gears. In our original example the 36-tooth gear must be rotated 35×37×31 times, or 40,145 times, before the originally existing set of meshes, or angular relationships of the four gears is repeated. In the meantime the gears will have passed through every other possible combination of the meshes, or angular relationships.

If we concentrate our attention on a particular arc on the 36-tooth gear that is long enough to extend from its region of mesh with one of the adjacent gears to its region of mesh with the other adjacent gear, and if this arc is one in which the average tooth spacing is too great, so that the arc as a whole is too long, and if, further, the axes of rotation of the other three gears are fixed in positions such that this too-long arc on the 36-tooth gear has just room to rotate through its position of tightest engagement with the two gears with which it meshes, we see that this too long arc can return to this position of being in mesh at its ends with the two adjacent gears 40,145 times, during which process it will be engaged with 40,145 different combinations of arcs on the three other gears of the system, these constituting all the possible combinations, before the cycle begins to repeat.

Since the arcs between the regions of mesh on the other three gears appear in all possible combinations, all of the teeth of these three gears are involved equally in these combinations, so that during the 40,145 revolutions of the desired gear, the lengths of these arcs on the average are the same as the lengths of the corresponding arcs of perfect gears having the same pitch diameters. Thus, by this averaging process if the adjacent gears are enabled to lap or shave the teeth of the desired gear, the spacings of its teeth will be corrected, though less rapidly, in the same way as if the three auxiliary gears were originally perfect, assuming again that the gears are gradually moved closer to each other as the removal of material from the faulty teeth progresses. Furthermore, the argument just given as it applies to any arc on the "desired" gear in which the teeth have an incorrect average spacing applies equally well to any arc on any of the four gears over which the average spacing is either longer or shorter than the correct value, so that if they are all enabled to act slowly upon each other, as by the application of a lapping compound, all the teeth of all four of the gears will be corrected progressively, until finally a condition is reached in which all the meshed teeth have uniform contact at all times.

The principal emphasis in the above analysis has been on the correction of errors of *tooth-spacing* in the gears which make up the closed train. Since the lapping operation eventually removes all interfering areas on the teeth of each gear, it is obvious that it also removes all the deviations from the involute tooth-form which arise originally from the successive cuts taken in hobbing or shaping the teeth. It is likewise obvious that the procedure removes any eccentricity that may be present in each gear as it comes from the original tooth cutting operation.

The above description of my invention has been given in connection with a particular method of selection of the numbers of teeth on the gears used to make to make up each set to be lapped. Actually, it is not necessary to adhere to this strict method. A more detailed analysis shows that the correcting action will take place, although not as rapidly, even if the gears have numbers of teeth that have common factors, as long as we avoid using two gears that have the same number of teeth or two gears one of which has a number of teeth that is a multiple of the number of teeth on the other. However, it is so easy to select gears in accordance with the rules laid down in the foregoing discussion that in most cases it is advantageous to use this method. When the four numbers of teeth on the four gears have no common factors, both widely separated and closely grouped irregularities of the tooth-spacing are corrected as rapidly as possible.

To perform manually the necessary adjustment of moving the shafts on which the gears are being rotated closer and closer together in very small steps, securing them rigidly after each movement as the lapping and correcting process proceeds, is possible, but very slow and tedious. What my mechanism for correcting gears accomplishes is to satisfy these two essential conditions for the process automatically. It provides bearings for the rotation of the gears which are very nearly fixed, in the sense that any one of them can be displaced only slowly, even by the application of a large force. At the same time it provides a still slower but almost continuous movement of the axes toward each other at a rate determined automatically by the rate at which material is removed from the teeth that are being corrected. This automatic maintenance of a condition of tight but not too tight mesh of the four gears in the closed train enables them to correct each other more rapidly and far more accurately than could be accomplished by manual adjustment. This mechanism will now be described.

Referring to FIGURE 1, the gears 1, 2, 3 and 4 are mounted to rotate on their own center holes on cylindrical shafts 11, 12, 13 and 14. These shafts themselves preferably do not rotate. The shafts are supported by massive carriage blocks 21, 22, 23 and 24. These four carriage blocks may conveniently be made of cast iron. Their bottom surfaces are made accurately flat by grinding, lapping, or hand scraping. The carriage blocks are supported by a flat surface 20, such as the upper surface of a heavy cast iron surface plate. Between this surface plate and blocks 22, 23 and 24, however, intermediate supports as shown in FIGURE 6 are interposed. An intermediate support is not needed in the case of the carriage block 21 which is arranged to be clamped by a hand wheel 55 after it has been adjusted to a suitable position. Block 21 is accordingly made higher than the other three blocks by an amount equal to the thickness of the intermediate support shown in FIGURE 6.

Shafts 11, 12, 13 and 14 are made as shown in FIGURE 7. Holes 25 which fit the larger cylindrical portions of these shafts are bored in the four carriage blocks as is shown by the sectional view of the right side of FIGURE 3. These holes are bored accurately perpendicular to the bottom surfaces of the carriage blocks and, therefore, when the four carriage blocks together with the three intermediate supports are standing on the flat surface 20, the four shafts are parallel to each other.

Each of the intermediate supports as shown in FIGURE 6 consists of a retaining plate 26 drilled through with a large number of holes 27 as shown in the figure together with a sufficient number of accurately spherical steel balls 28, all of the same diameter, to fill these holes. The holes are slightly larger in diameter than the balls. In an actual case the balls may be of 0.5000 inch diameter all within 0.0001 inch, and the hole diameter may be of the order of 0.505 or 0.510 inch. The thickness of the retaining plate may be of the order of 0.497 inch. These values are given merely by way of illustration and are not to be regarded as in any way limiting. Quite different values might be chosen in some cases according to principles which will be explained.

Obviously when one of these intermediate supports is placed between the flat surface 20 and the bottom of one of the carriage blocks, the bottom surface of the carriage block is supported parallel to the top surface of the surface plate within a limit determined by the maximum difference existing between diameters of the individual steel balls.

Figure 3:
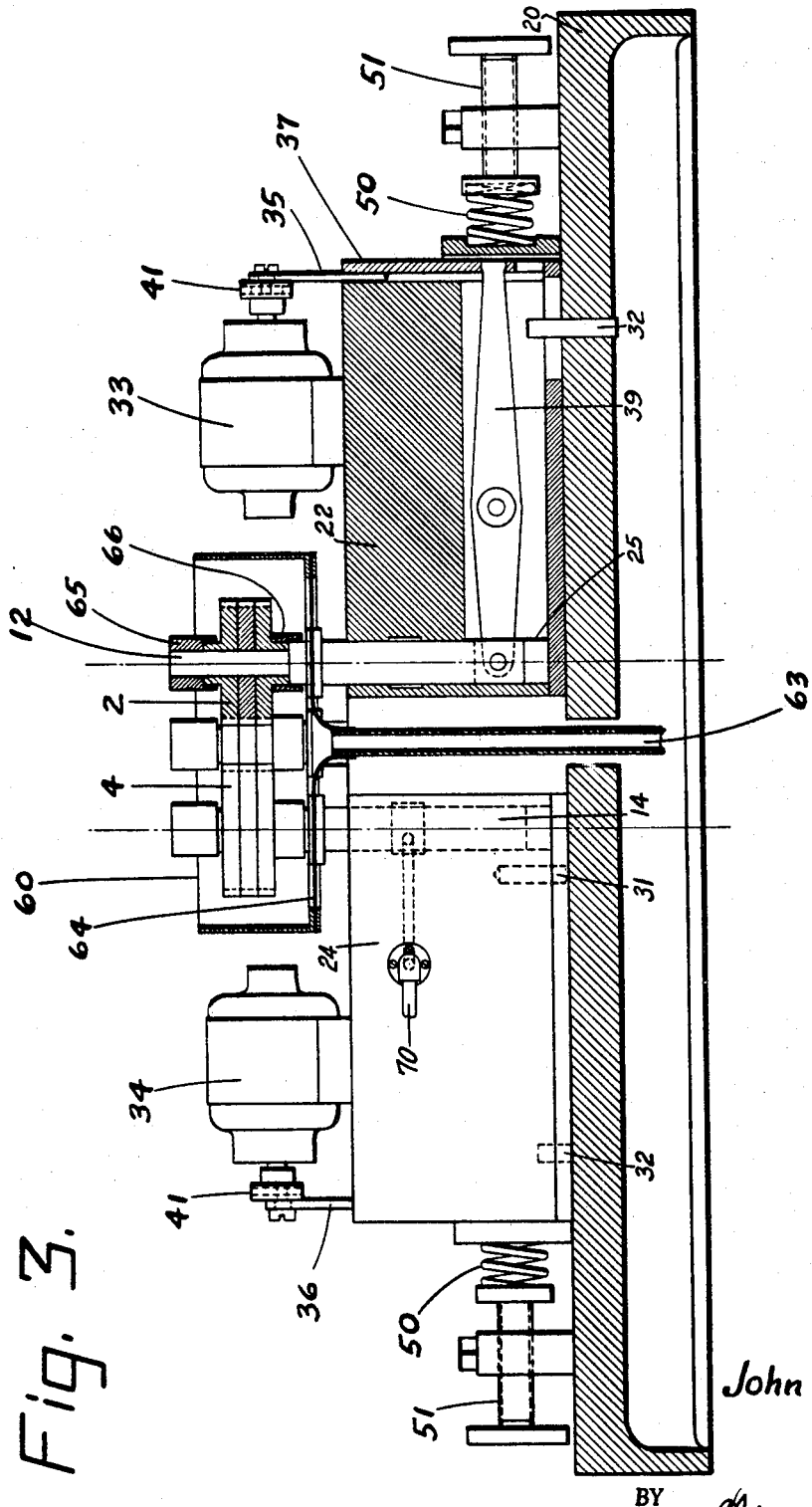
FIGURE 3 is a view in elevation toward diagonal III—III of FIGURE 1 showing the gear mounting unit at the right of the figure in section.

One of the holes in the retainer 26, marked 29, does not have a steel ball in it, but instead engages the end of a loosely fitting pin 31 projecting downward into it from the bottom of the carriage block, as shown in FIGURE 3. Also, at its opposite end the retaining plate 26 has a slot 30 through which pin 32 projects upward from the surface plate 20 into a slot milled lengthwise in the bottom of the carriage block, as is also shown in FIGURE 3. By this construction the retaining plate 26 is kept in approximate alignment with the bottom of the carriage block, and travels with it as the carriage block rolls on the balls 28. The pins 32 serve to hold the outer ends of the carriage blocks 22, 23 and 24 in suitable positions on the surface plate 20. The construction permits the carriage blocks and the retaining plates 26 to move toward and away from the center of the plate 20, and at the same time the shaft-supporting ends of the carriage blocks have the necessary freedom to move laterally in response to pressures in the gear train.

The holes 27 in the retaining plate 26, around the steel balls 28, and the spaces between the lower surface of retaining plate 26 and the surface of the surface plate 20 and between the upper surface of retaining plate 26 and the bottom surface of the associated carriage block (22, 23 or 24) existing because the thickness of the retaining plate is not quite as great as the diameter of the steel balls, are filled with a viscous oil. The purpose of this oil, in addition to its functions as a lubricant and as a rust preventive, is to introduce viscous friction which resists any rapid displacement of the carriage block, while freely permitting very slow displacement.

Each carriage block itself resists rapid displacement by the inertia of its mass, while at the same time, since it is supported to move by rolling on the steel balls it, can be displaced slowly by even a relatively small force.

The shafts 12 and 14 which are mounted in carriage blocks 22 and 24 are arranged to be reciprocated in the directions of their axes by means of the motors 33 and 34, linkages 35 and 36, dovetail slides 37 and 38, and a pair of rocker arms of which one, 39, may be seen in the sectional view of the right-hand side of FIGURE 3. Motion is imparted to the link 35 or 36 by means of an adjustable eccentric 41 mounted on the shaft of the motor. By means of this adjustment the amplitude of the vertical oscillatory motion imparted to the shaft 12 or 14 may be adjusted in a well-known way. The motor head contains gearing by which the speed of the external shaft is reduced to approximately 240 revolutions per minute. The shafts 12 and 14, therefore, are moved at a rate of approximately four oscillations per second. The amplitude of this oscillation is ordinarily adjusted to be about one quarter of an inch. The desirable amplitude and rate depend upon the thickness and diameter of the gears that are being corrected, and must be learned by experience.

Carriage block 23 has mounted on it a motor 43 which is provided with a right-angle reduction drive leading to a pulley 44 which is coupled by a belt to another pulley 45 attached to gear 3. By this means gear 3 is rotated, and since gears 1, 2, 3 and 4 form a closed train, all four of the gears are maintained in rotary motion.

Gear 1 is mounted on shaft 11 which in turn is mounted on carriage block 21; this carriage block is clamped in a suitable position on surface plate 20 and, therefore, the position of shaft 11 is fixed. It is not necessary to give shaft 11 any vertical motion; preferably it is clamped firmly in block 21 so that gear 1 is supported at a height that is midway between the top and bottom positions of the stroke imparted to shafts 12 and 14.

Preferably also shaft 13 is clamped firmly in carriage block 23 so that gear 3 is supported at the same height as gear 1 in relation to the surface plate 20. Gears 1 and 3 then rotate but they do not move vertically. Gears 2 and 4 rotate and are also moved vertically as before described. This vertical motion of gears 2 and 4 provides the primary lapping action between the teeth of the gears. Some lapping action results from the rotation of the gears, but this is not of great significance because the teeth have a rolling rather than a sliding motion with relation to each other, and, particularly at the pitch line, this is a pure rolling action so that no lapping would occur at the pitch lines if gears 2 and 4 were not given the vertical motion described.

Three springs 50 backed up by adjusting screws 51 push the carriage blocks 22, 23 and 24 in the direction of the center of the gear system. By means of these adjusting screws the amount of pressure applied to force the gear teeth into mesh may be adjusted to suit the size of the gears being lapped. Since support blocks 22, 23 and 24 are mounted on the systems of steel balls previously described, they can move inward under the pressure exerted by the springs 50, but this motion is necessarily slow even if the gears are not in form contact because the inertial reactions of the massive support blocks and the viscous friction in the oil films under them strongly oppose any rapid motion.

A shield pan 60 mounted on supports 61 surrounds the four gears, as may be better seen in FIGURE 3, so that it is possible to apply a stream of oil or other lubricant containing suspended finely powdered silicon carbide or other lapping abrasive to the rotating gears without having this fluid reach the other parts of the mechanism. This combination of lubricant and lapping abrasive is applied to the gears through one or more jets 62, and is carried away after it has been caught in the catch basin by flowing down a central pipe 63 shown in FIGURE 1 and FIGURE 3. The bottom of the catch basin is a sheet of oil resistant synthetic rubber 64 which is secured around the four shafts by flanges and washers. This permits the vertical motion of shafts 12 and 14.

The gears which are lapped in this mechanism are ordinarily arranged in stacks as is shown in FIGURE 3. This is advantageous because a stack of gears can be lapped as quickly as a single gear, and the height of the stack makes it possible to use a greater amplitude of vertical motion of shafts 12 and 14 so that the lapping action is more nearly uniform over the entire surface of the gear face. The outside gears of these stacks are made with hubs so as to increase the lengths of the bearings on the shafts 11, 12, 13 and 14, upon which the stacks of gears rotate and also to provide for the use of overhanging protective shields such as 65 and 66 which prevent the lapping fluid entering the bearings between the gears and such shafts.

Lubricating oil under high pressure is applied through a line 70 as shown in FIGURE 3 to each of the four support blocks. This oil lubricates the large portions of shafts 12 and 14 where they move axially in the bearing holes 25 in the cast-iron blocks 22 and 24, and it also passes through the systems of holes shown in FIGURE 7 so that it lubricates the bearing between each rotating stack of gears and the smaller portion of each shaft. The oil pressure is maintained high enough that a small amount of oil is always escaping from this system and flowing out under the shields 65 and 66. By applying lubricating oil under pressure in this way, it is possible to maintain efficient lubrication with extremely small clearance between each of the shafts and the hole in the stack of gears. This clearance must be very small if the highest accuracy of the gears in terms of both uniform tooth-spacing and concentricity is to be obtained. If each stack of gears rotates on a non-rotating shaft, it is obvious that the teeth of the gears in this system must be lapped to a condition of substantially perfect concentricity with respect to the center holes.

In placing this mechanism in operation, the four gears or stacks of gears are mounted on the shafts 11, 12, 13 and 14 and a pulley 45 is attached to the stack mounted on shaft 13 so that the gears may be rotated by the belt leading from pulley 44. In order to mount the gears, the support blocks must naturally be moved outward so that the gears are not in mesh. After the gears have been mounted, the support block 21 is clamped in a suitable position and the other blocks 22, 23 and 24 are moved in until the teeth of the gears begin to mesh with each other. Suitable tension is then applied to the springs 50 and under this tension the blocks 22, 23 and 24 begin to move inwardly slowly. Motor 43 is started so that the train of gears is placed in rotation. The inward motion of the gears will then continue until the mesh is tight enough that the force developed by encountering the tightest of the tight spots in the rotation of the system prevents any further readily visible inward motion. The flow of abrasive through inlet pipes 62 is then started so that the gears are bathed in lapping compound and the motors 33 and 34 are started, imparting vertical motion to shafts 12 and 14 and to the gears carried by them. At first an extremely irregular operation is encountered with rapid alternations of tight running and free running of the gear train. This is soon greatly improved by the corrective lapping action which takes place as has been described in connection with FIGURE 2. As the points of interference in the gear train are lapped down, the support blocks move inward in response to the pressure exerted by the springs 50 so that a condition of tight mesh always exists at those points where the engagement is tightest. Eventually a condition of uniformly smooth running is achieved. At this point the pitch diameter of the desired stack of gears can be measured and from this it can be determined on the basis of experience how much more lapping will be required to bring the pitch diameter to the desired value.

Obviously in order to produce one gear or stack of gears having a desired number of teeth and having extreme accuracy, it has been necessary to produce four gears or stacks of gears all having the same high degree of accuracy. This is a price that must be paid in order to attain the highest accuracy. This disadvantage does not apply when the mechanism is used to *shave* gears, as discussed in the introductory part of this specification, this being the second mode of operation embodying my invention.

Before describing this second mode of operation, however, it appears to be desirable to proceed with the detailed description of FIGURE 4 and FIGURE 5, which show a mechanism that is structurally different from the one shown in FIGURE 1 and FIGURE 3 but which performs the same basic functions of supporting the four gears on parallel shafts, bringing them into mesh, rotating them, imparting reciprocatory motion to two of them in the direction of their axes, and maintaining the positions of the four axes of rotation nearly fixed while at the same time moving them slowly toward each other so as to take up the slack created by the removal of material from the teeth of the gears.

Referring to FIGURE 4, a base 100, preferably a massive metal casting, supports four parallel shafts 101, 102, 103 and 104. These shafts may advantageously be of substantial size in order to provide adequate rigidity; for example, in a practical embodiment of my invention designed to handle gears up to six or eight inches in diameter, these shafts might well be made three inches or even four inches in diameter of hardened steel.

A portion of the base 100 and one of the shafts, 102, are shown in FIGURE 5, which is a view in elevation looking from approximately the position of shaft 103 in FIGURE 4.

Referring then to both FIGURE 4 and FIGURE 5, shaft 102 supports a lever 112 which is held in place by a collar 106. Correspondingly, shafts 101, 103 and 104 support levers 111, 113, and 114, respectively, and these are held in place by collars 105, 107 and 108, shown in FIGURE 4.

Levers 111, 112, 113 and 114 carry, at their swinging ends, shafts 121, 122, 123 and 124, which are held in their places by metal discs 115, 116, 117 and 118, fastened to the shafts by screws threaded into the ends of the shafts 121, 122, 123, and 124. These shafts in turn support four more levers 131, 132, 133 and 134, of which 132 is shown in FIGURE 5.

When this mechanism is fully assembled and in the condition in which it is used, the levers 131, 132, 133 and 134 stand approximately at right-angles to their respective supporting levers 111, 112, 113 and 114, as shown in FIGURE 4. In FIGURE 5 lever 132 has been shown as though placed in a straight line with lever 112 in order to make it possible to display in the drawing the structure of both levers and the way in which they are linked together at shaft 122. The other three pairs of linked levers have the same structure as far as these linkages are concerned.

At the smaller end of each of the levers 131, 132, 133 and 134 is an accurately bored bearing hole, and in each of these is a shaft. These shafts are identified by the numbers 141, 142, 143 and 144. The shafts 142 and 144 are formed as shown in FIGURE 5, in which it may be seen that shaft 142 has near its lower end a flange 146 of increased diameter. This flange and the lower end of shaft 142 extending beyond the flange are enclosed by a cap 152 which is attached by a threaded portion to the bottom of lever 132. The flange 146 fits the inside of the cap 152 so that these parts constitute a piston and cylinder. Two inlet pipes, 156 and 157 are attached to the cap, or cylinder 152, as shown in FIGURE 5. These inlet pipes are connected by suitable tubing to an oil drive system (not shown) by means of which oil under pressure is supplied alternately to pipe 156 and to pipe 157, so as to drive shaft 142 alternately up and down within its bearing in lever 132. The frequency and amplitude of this reciprocatory motion of shaft 142 can be controlled easily in a well-known way by controlling the flow of the oil supplied to pipes 156 and 157.

Shaft 144 is arranged in the same way to be driven up and down within its bearing in the end of lever 134.

Shafts 141 and 143 are not necessarily made with flanges corresponding to flange 146, and the levers 131 and 133 in which they are mounted are not necessarily fitted with caps corresponding to cap 152. These two shafts 141 and 143 may be fixed in the ends of their respective levers, as for example, by the use of set screws.

Each of the four shafts 141, 142, 143 and 144 has a section of reduced diameter at its upper end, as is shown with respect to shaft 142 in FIGURE 5. On each of these smaller diameter sections a gear or stack of gears may be mounted to rotate, as is shown by the dotted lines in FIGURE 5. The mounting of the gears in each of these cases is the same as the corresponding gear mountings shown in FIGURE 1 and FIGURE 3.

A collar 147 having a recessed bottom section forming an overhanging skirt is attached by set-screws or in any equivalent way to the top of each of the shafts 141, 142, 143 and 144, as is shown with respect to shaft 142 in FIGURE 5. Each of these collars serves to retain the gear or stack of gears on its shaft and to prevent appreciable endwise motion of such gears on that portion of the shaft on which they rotate. At the same time the skirt on each of these collars serves to prevent the lapping or shaving lubricant from entering the bearing between the gear and the shaft.

A second collar 149 is mounted on the bottom hub of the gear or stack of gears on each shaft, as is shown in relation to the gears on shaft 142 in FIGURE 5. This collar likewise carries a skirt which extends downward over the end of the bearing in the associated lever far enough that even in the cases of shafts 142 and 144, which have up and down reciprocatory motion, the lapping or shaving lubricant is prevented from entering the bearing in which the shaft is mounted.

A pully 148 is mounted on the gear which rotates on shaft 143, and this pulley is driven by a belt 160 which receives its power from another pulley 161 mounted on a motor 162 which in turn is mounted on a flat surface formed on the larger end of lever 133. By this means the closed train of four gears, 201, 202, 203 and 204, is maintained in rotary motion. The motor 162 may, of course, be operated either by electricity or from some other source of power; it may, for example, be driven by compressed air or by some fluid under pressure.

In the case of each of the lever systems shown in FIGURES 4 and 5, it is important that the bearings in which the sets of shafts 101, 121 and 141; 102, 122 and 142; 103, 123 and 143, and 104, 124 and 144, are mounted and machined in such a way that these shafts are parallel to each other, at least to within a few ten-thousandths of an inch. This is a standard of accuracy that is not difficult to maintain in a good machine shop. Thus, when the mechanism shown in topview in FIGURE 4 is assembled as there shown, the four shafts on which the gears 201, 202, 203 and 204 are mounted are parallel to each other within narrow limits.

Each of the smaller levers 131, 132, 133 and 134 has attached to it two pivot rods 171, shown in FIGURES 4 and 5. Each of these pivot rods, in turn, has attached to it a thrust rod 172 connected to a piston 173 which moves in a cylinder 174. Each of these cylinders 174 is attached by a pivot 175 to a vertical post 178, which is supported by the base 100.

Oil or other suitable fluid under pressure may be supplied to all of the cylinders 174 through the inlet pipes 177. This fluid must enter each cylinder through a small adjustable valve 176. When oil or other fluid under pressure is so supplied to the cylinders, the thrust rods 172 and, therefore, the levers 131, 132, 133 and 134 are pushed toward the center of the mechanism. Thus, when gears such as 201, 202, 203 and 204 are mounted in the mechanism for the purpose of improving their accuracy by the lapping action previously described, they can be brought into close mesh and so maintained by the thrusts developed in the cylinders 174 by the fluid under pressure supplied to these cylinders. The force with which these gears are pressed into mesh can be controlled by suitable control of the pressure in this fluid by means of pressure-reducing valves or other well-known means.

The system of cylinders, thrust-rods, inlet-pipes, and valves just described, accomplishes the two functions that are necessary to control the lapping or shaving of the gears as previously described; that is, it holds the axes of rotation of the gears in their positions in such a way that rapid displacements of these axes are strongly resisted, while at the same time it provides for moving the axes closer together at a very slow rate which is automatically controlled by the rate at which material is removed from the teeth of the gears, the amount of inward motion being just sufficient to maintain the degree of tightness of mesh that has been predetermined by the adjustment of the pressure in the fluid supply. This action takes place because the valves 176 allow only a very slow flow of fluid into or out of the cylinders 174. When a tight spot is encountered in the rotation of the four gears, the effect, as has been explained in connection with FIGURE 2, is to create forces tending either to push the axes farther apart or to pull them toward each other. These forces arise and subside rapidly during the rotation of the closed train of gears; they are resisted strongly by the cylinders because in order to displace the piston in one of these cylinders by a measurable amount it is necessary either to expel or to draw in an appreciable volume of the nearly incompressible fluid through the valve 176. This cannot be done rapidly because the fluid is viscous and the valve is almost completely closed. The setting of the valve that is necessary to give the most desirable action will depend on the actual viscosity of the fluid, which may preferably be an oil of fairly high viscosity. At the same time that the valve acts thus to prevent rapid changes in the position of the piston in the cylinder it still permits a very slow inflow of fluid in response to the pressure in the incoming fluid line, so that if the setting of the valve is suitable, the gears are moved toward each other just fast enough to maintain the desired pressure between them. The setting of the valve is not critical since this pressure between the gears is determined by the fluid pressure in the supply systems; all that is necessary is that the valve be open far enough to permit the entry of the required small amount of fluid into the cylinder. The valves advantageously may have graduated circular scales on or associated with their control knobs, so that settings may be predetermined, since it is convenient to be able to open the valves in order to permit freer movement of the levers when gears are being removed from or mounted in the machine.

The mechanism shown in FIGURES 1, 3 and 6, and the alternative mechanism shown in FIGURES 4 and 5, illustrate some of the different means by which we can obtain the type of control over the motions of the shafts carrying the four gears that is necessary for my new gear correcting process. The requirement is that the four shafts shall be held in very nearly fixed positions, in the sense that these positions cannot be changed quickly even by the application of the rather large forces that arise from the interferences in the gear-train especially during the early stages of the correcting process, while at the same time these shafts can be moved slowly closer together by the constant application of smaller forces acting in the inward direction.

In the mechanism of FIGURES 1 and 3 the four shafts are carried by massive blocks of metal. These by their inertia oppose rapid motion while at the same time, since three of these metal blocks are mounted on accurately made spherical balls 28, they can be moved slowly by any small force. When the machine is in use they are always urged inward by the pressure of the springs 50, and thus they move inward very slowly at the rate that is made possible by the removal of material from the teeth of the gears.

At the same time, in the machine of FIGURE 1, the extensive thin films of oil between the large shaft-supporting blocks and the metal slabs under them oppose rapid displacement of the blocks by viscous friction. When the film of viscous fluid is only a few thousandths of an inch thick, and especially if the oil is of a type that has high viscosity, this type of action can oppose rapid motion even more effectively than inertia. Here again very slow motion can take place even under the action of a feeble driving force.

In the mechanism shown in FIGURES 4 and 5 the positions of the four gear shafts are primarily determined by the volumes of fluid in the eight cylinders attached to the shaft supporting lever arms, and the positions of these arms and shafts cannot be changed quickly by any force arising in the operation of the device because the fluid in each cylinder is relatively incompressible and because any rapid movement would require the rapid transportation of substantial volumes of fluid through the very nearly closed valves. Hence, rapid movement of fluid is opposed by both the inertia of mass of the fluid and its viscosity. Thus, the control, in its essence, revolves itself again into a combination of inertia and viscous friction, but in this case the mode of application of these properties of matter is so far different from that shown in FIGURES 1 and 3 that the identity of principle might easily be overlooked.

Other methods of control can be employed. For example, in FIGURE 4 the joints between shafts 101, 102, 103 and 104 and levers 111, 112, 113 and 114, respectively, and between levers 111, 21 and 131, etc., may be provided with flanges which can contain thin layers of the oil-suspended filaments of iron that have been made familiar by their use in what are called fluid magnetic clutches. Magnet coils associated with them in well-known ways can be excited so as to lock these joints very firmly against movement. If the exciting currents are removed momentarily at frequent intervals, a set of springs similar to the springs 50 in FIGURE 1 will move the gear shafts closer to each other by a small amount at each such interruption of the current. The resulting action will be essentially the same as that obtained by the combined intertia-viscous friction control.

FIGURE 5A shows this construction as applied to the parts supporting one of the gears in the general type of structure shown in FIGURE 4; for example, the structure containing arms 111 and 131. Here a large flange 601 is made integral with the end of lever 111 which pivots on shaft 101. Shaft 101 is extended upwardly and has firmly attached thereto a cup-shaped part 604 which at its edges almost meets flange 601 forming gap 606 of a few thousandths of an inch, which gap is filled with oil containing small particles of iron. Another large flange 602 is made integral with the upper parts of the end of lever 131 where it pivots on shaft 121. Shaft 121 is now rigidly fastened to lever 111 by a plurality of pins 603 so that shaft 121 cannot rotate in the holes in the end of lever 111. The upper end of shaft 121 is extended upward and has firmly attached to it a second cup-shaped part 605, which at its edges almost meets flange 602, forming a second gap 607, of the same order of width as gap 606, which is also filled with oil containing small particles of iron. Cup-shaped parts 604 and 605 have spaces therein surrounding the upper ends of shafts 101 and 121, and these spaces are filled with coils of magnet wire 608 and 609. Coils 608 and 609 are connected to a source of direct current when a switch 610 is closed. A motor 611, connected to a source of electric power, rotates cam 612 by means of worm 616 and worm gear 617. Cam 612 is shaped to hold switch 610 closed through most of its cycle of rotation but once in each revolution it allows spring switch 610 to open, giving the action described in the preceding paragraphs. When switch 610 is open, spring 613 which is supported by fixed post 614 and arranged to be compressed by the adjustment of screw 615, is able to move the gear mounted on the end of lever 131 into tighter mesh with its mating gears.

As another alternative, very slowly acting screws can be used to push the shaft supports closer to each other provided the driving of each of these screws is controlled by some pressure sensitive control (such as a strain gage) that is arranged to allow forward motion of the screw only when the pressure between the gears remains lower than a suitably chosen value for a time longer than is required for a full rotation of one of the gears in the set of four being used. A construction suitable for controlling the meshing of the gears in this way is shown in FIGURE 5B. In this construction, one of the gears being worked upon is supported on one end of a lever 701, the opposite end of which carries a powerful leaf spring 702. A screw 703, supported by and threaded into an upright fixed post 704, presses against spring 702 in the direction to cause the gears being worked on to mesh more tightly. An adjustable screw 705 is threaded through the free end of spring 702 and is in position to press against the short end of a lever 706. When screw 705 presses against the end of spring-biased lever 706 the latter is held out of contact with a switch 707. If screw 705 does not touch lever 706, the longer arm of this lever closes switch 707. This occurs when the removal of metal from the gears being worked on makes the mesh looser so that lever 701, and especially its rear portion on which lever 706 is pivoted, moves in the direction away from screw 703, allowing spring 702 to deflect away from the end of lever 706. When switch 707 is closed, it energizes a time-delay relay 708, which is adjusted to act only after a time corresponding to a little more than one revolution of any one of the gears being worked upon. Such time delay relays are well known articles of commerce. If switch 707 remains closed long enough for relay 708 to act, power is supplied to a motor 709 which drives a speed reducer 710, having a very large speed reduction, and this in turn drives gear 711 which rotates gear 712, the latter mounted on the end of screw 703 on the side of the post 704 away from spring 702. Rotation of gear 712 advances screw 703, placing greater pressure on spring 702, so that the thrust transmitted through it pushes the gears being worked into tighter mesh. When the pressure on spring 702 has risen to the amount predetermined by the setting of screw 705, this screw again comes into contact with the end of lever 706 with the result that switch 707 is allowed to open; the relay 708 is de-energized, and the power to motor 709 is cut off, stopping the advance of screw 703.

I regard all of these control methods and others analogous to them as coming within the scope of my invention.

FIGURE 4 shows two jet pipes 181—181 through which lubricant and/or lapping compound may be directed upon the gears 201, 202, 203 and 204. When the mechanism of FIGURE 4 is to be used for gear shaving, it is advantageous to provide several such jets so that lubricant under pressure may be sprayed copiously over the gears to wash away the chips that result from the shaving action.

I have not shown any type of catch basin or shield pan similar to 60 of FIGURE 1, surrounding the gears in the mechanism of FIGURES 4 and 5, because it is not difficult to seal the joints of a structure such as is shown in these figures so that they will not be damaged by the lubricants even if they contain lapping abrasives. For example, channels may be machined near the edges of circular collars or retaining discs such as 115, 116, 117 and 118 in FIGURES 4 and 5, and rings of synthetic rubber, commonly called O rings, can be inserted in these channels to seal the joints against externally applied liquids. These rings are identified in FIGURE 5 by the reference number 191. Obviously, gears can be put in place on the four shafts or removed from them more easily if a shield pan is not required.

In spite of the differences in structure between the mechanism shown in FIGURES 4 and 5, and the one shown in FIGURES 1 and 3, the operational procedure is essentially the same. The four gears are mounted on their shafts; they are brought into loose mesh and are then set into rotation by energizing the motor 162. The pressure of the fluid in the system that supplies the inlet pipes 177 is then raised to the proper value, and if the valves 176 are open the gears are promptly moved into close mesh. At this point the valves 176 are adjusted to their nearly closed settings. A flow of cutting lubricant, containing, if necessary, a suitable lapping abrasive, is admitted through the jet pipes 181, and the reciprocatory axial movement of gears 202 and 204 is established by turning on the supply of driving fluid to the pipes 156 and 157, shown in FIGURE 5. The machine is then allowed to operate until smooth running of the closed gear train has been established and the pitch diameter of the desired gear, in this case assumed to be gear 201, has been brought down to the desired valve.

In describing my invention up to this point I have placed emphasis upon the desirability of selecting the four gears that are to make up the closed train in such a way that the four numbers of teeth that are used have no common factors other than unity. In any case in which it is necessary to make a large number of gears all having the same number of teeth and all requiring the highest order of accuracy, this can be a major inconvenience, since the procedure involves making up three gears having undesired numbers of teeth in order to obtain one having the desired number.

By a modification of the mechanism shown in FIGURE 1 or of that shown in FIGURE 4, this inconvenience can be avoided, with the result that each cycle of operation of the machine will produce four gears all having the same number of teeth.

The method of my invention depends upon two principal facts which can be seen most readily by reference to FIGURE 2. The first is that when four gears are meshed tightly to form a closed train, as shown in that figure, and when their axes of rotation are fixed or very nearly fixed, there is at any instant a determined relationship between those two sets of teeth on two of the gears not meshing with each other which are in mesh with a third gear. This relationship is determined by the fact that these two gears also mesh with the fourth gear. Thus, in FIGURE 2, at any instant force would be required to change the distances between the teeth of gear No. 2 in the region "A" and the teeth of gear No. 4 in the region "B," and this condition exists because gear No. 2 and gear No. 4 are both in mesh with gear No. 3.

The second principal fact is that when three gears related in the way that gears 2, and 3 and 4 are related in FIGURE 2 are meshed in many different angular relationships, the average of all the distances thus established, measuring from the teeth in the region "A" to the corresponding teeth in the region "B," is very nearly the same as the distance that would be established by meshing three perfect gears having the same numbers of teeth as the three actual gears. As the number of angular relationships increases until it becomes equal to the maximum possible number of angular relationships, which is determined by the numbers of teeth on the three gears, as has been explained previously, the average distance from "A" to "B" becomes exactly equal to that which would be established by meshing three perfect gears.

Because the facts stated in the two previous paragraphs are true, the teeth of two gears meshing with a third gear in the manner of gears Nos. 2, 4 and 3 in FIGURE 2 can provide a set of tools to correct the spacings of the teeth of still another gear that meshes with them in the manner of gear No. 1 in this figure, if the angular relationships of the first three gears are continually changed.

If, therefore, we mesh four gears *all having the same number of teeth*, or gears whose numbers of teeth are in simple ratios, to form a closed train on a mechanism such as the one shown in FIGURE 1 or the one shown in FIGURE 4, and if, after having rotated the gears for a time and caused their teeth to lap the teeth with which they come into mesh, we disengage them from each other, turn them at random into different angular positions and then reengage them, bring them again into tight mesh, and allow them again to rotate and to lap each other for a time, and if we continue to disengage the gears and reengage them randomly in this way after suitable, not necessarily equal, intervals of time, while allowing them in the intervals to rotate and lap each other, we shall satisfy the conditions that are necessary in order to have the gears mutually correct each other, and therefore when the machine has operated for a sufficient length of time, all four of the gears will have been brought to a state very near perfection.

Figure 10:
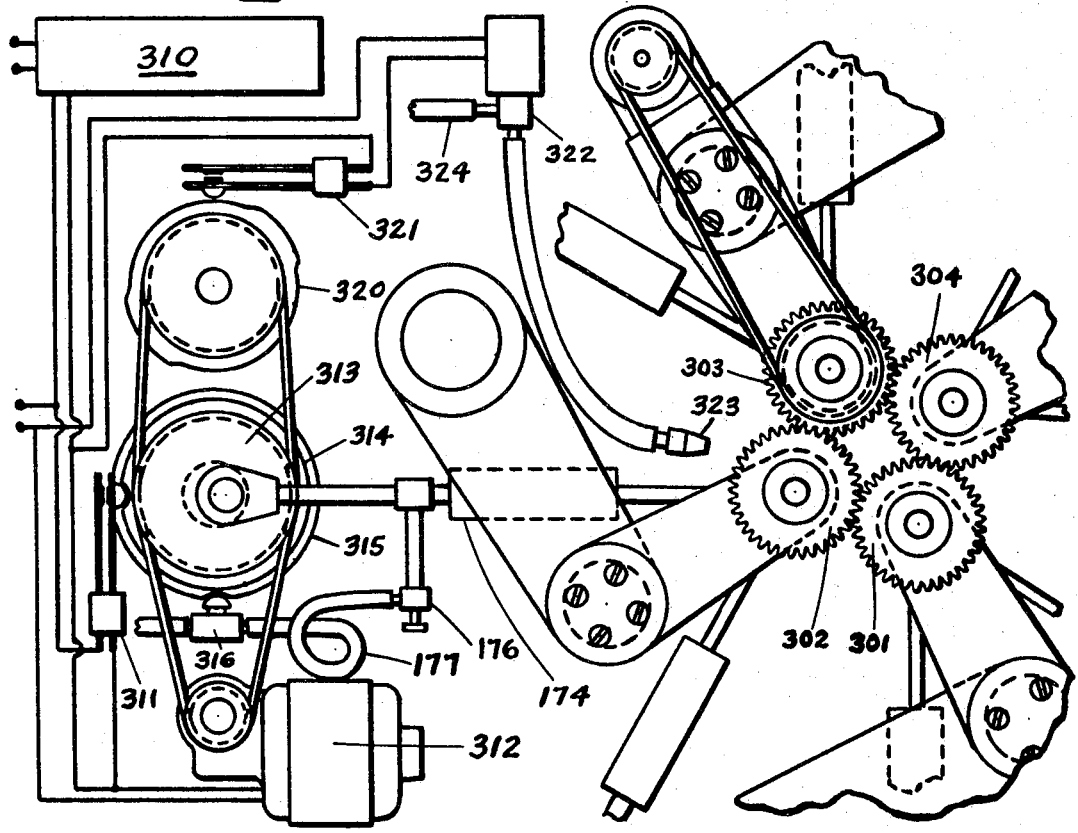
FIGURE 10 is an illustrative diagrammatic view of an automatic control mechanism which may be used in association with apparatus such as is shown in FIGURES 4 and 5 to apply the basic principles of my invention in a different and useful way.

To control the machine in this way by remaining in constant attendance upon it would, of course, be a difficult task. It is possible, however, in any one of a number of ways, to provide the machine with an automatic control that will operate it in this way. In FIGURE 10 I have illustrated a control that is suitable for use with the mechanism of FIGURE 4 to accomplish this purpose.

In this FIGURE 10, which is essentially diagrammatic, with the parts making up the control shown much larger in relation to the parts of the basic machine than would be the case in a practical construction, one of the cylinders 174 belonging to the mechanism of FIGURE 4 is shown connected to an eccentric 313 by which it can be moved away from and then toward the center of the basic structure. The complete control system consists of eight such eccentrics and associated parts as shown in FIGURE 10.

The eccentric 313 is driven by a belt from a motor 312, which contains a gear reduction such that one revolution of the eccentric 313 is accomplished in a time of the order of one second or a few seconds.

The motor 312 does not run continuously; it is controlled by the combination of an intervalometer 310 and a switch 311. The intervalometer is a well-known device of which several types are commercially available.

The switch 311 is opened and closed by a cam 314 fastened to the eccentric 313. The electrical contacts of the intervalometer and the switch 311 are connected in parallel, as may be seen by tracing the circuit shown in the figure. Switch 311 is open when the eccentric is in the position that holds the cylinder 174 inward and, therefore, holds the gear 302 in its position of mesh with the three other gears 301, 303 and 304, which in this case are shown as all having the same number of teeth. At this point a notch in the cam 314 allows the actuating button of switch 311 to move into the "open" position.

At suitable intervals the intervalometer 310 closes its contacts for a fraction of a second. This causes motor 312 to start, so that during the duration of the impulse it receives from the intervalometer, it rotates eccentric 313 and cam 314 far enough that switch 311 is held closed. The motor, therefore, continues to run after the intervalometer has opened its contacts until one revolution of eccentric 313 has been completed. At this point the notch in cam 314 allows switch 311 to open, and the motor stops.

During the cycle just described the eccentric 313 and the other eccentrics corresponding to it, attached to the cylinders 174, draw the gears out of mesh and then return them to mesh.

A second belt groove on the outside of eccentric 313 carries another belt which connects it at a ratio somewhat greater than unity with another cam 320. This cam carries two unequal raised portions which are approximately but not accurately 180 degrees apart. Either of these raised portions can close another switch 321 when it comes against its actuating button. Switch 321 controls a solenoid valve 322. Switch 321 and the parallel combination of switch 311 and the intervalometer are in series, so that switch 321 receives power only when motor 312 is energized. Twice during the rotation of eccentric 313, therefore, the solenoid valve 322 is actuated, but the time intervals between the starting of motor 312 and the actuations of solenoid valve 322 are never twice the same, since the belt drive of cam 320 from eccentric 313 provides a constantly changing relationship between them.

Solenoid valve 322 receives cutting lubricant (oil or a mixture of oil, water, and other materials) under moderately high pressure through a pipe line 324; when the valve is open it permits this lubricant to be discharged through a jet 323 which is so positioned that the fluid impinges on gear 302 in a direction such that when this gear is out of mesh with the others in the train, it will be set rotating. Similar jets are positioned to direct streams of lubricant against the teeth of gears 301 and 304; these jets are controlled by two additional solenoid valves similar to 322.

It may be seen, therefore, that whenever the intervalometer 310 closes its contacts, motor 312 and the seven other motors in the system are started; each of these motors rotates an eccentric like 313, with the result that the gears 301, 302, 303 and 304 are pulled out of mesh and then remeshed. While they are out of mesh, each of three of the gears is struck by one or two streams of lubricant impinging with high velocity, so that it is set into rotation. Two separate streams are needed in each case because, since the timing of the opening of the valve varies from cycle to cycle, one of them may be delivered while the gears are still in mesh. These streams of lubricant will not strike the three gears at the same time because the belt drives from the eccentrics 313 to the auxiliary cams 320 do not keep them in step with each other; in fact, it is advantageous if the three pulley ratios are intentionally made slightly different.

Because of the random timing of these jets of lubricant, the three gears 301, 302 and 304 are rotated through randomly varying angles, so that each time they are remeshed their teeth are engaged differently, as is required in order that all their tooth-spacings may ultimately be made equal by the lapping process.

A third cam 315 is attached to each eccentric 313 and cam 314. This cam has a notch which, at the times when the gears are meshed, comes opposite the actuating knob of a fluid valve 316. The valve 316 is in the line 177 by which fluid is supplied to the nearly closed valve 176 leading to the cylinder 174. Whenever the eccentric 313 is in motion this cam 315 closes line 177 so that no fluid flows into cylinder 174 during the times when the gears are out of mesh. Thus when the gears are reengaged they mesh with the same degree of tightness as before they were disengaged. At the instant when the reengagement of the teeth has been completed, valve 316 is permitted to open again. This is accomplished by a spring built into the valve 322, which is of a known type. Thus, while the lapping process is carried on after each reengagement of the gears, the slow inflows of fluid through valves 176 maintain the predetermined closeness of mesh, as in the previously described operation of the mechanism of FIGURE 4 when it is used without the auxiliary equipment shown in FIGURE 10.

The complete system for this method of employment of my invention requires one intervalometer 310, eight motors 312, eight eccentrics 313 and switches 311, eight valves 316, three auxiliary cams 320 and switches 321, three solenoid valves 322, three jets 323, and all the parts of the mechanism shown in FIGURES 4 and 5 described previously in connection with those figures.

It should be understood that this particular mechanism for providing periodic disengagement and reengagement of the four gears together with random rotations of the gears while they are disengaged is shown only by way of example, since these functions may be obtained in many other ways which will readily occur to those who are skilled in machine design.

Before leaving the subject of gear lapping with these mechanisms it is necessary to point out two requirements of the process which differ from normal gear manufacturing practice.

When gears are hobbed or produced by a gear shaper, the addendum—the height of each tooth above the pitch circle—is always made less than the dedendum—the depth of the tooth spaces below the pitch circle. This is necessary in the ordinary operation of gears in order to insure that the contacts between mating gears are only on the flanks of the teeth. In lapping gears by my new method, however, it is desirable to establish the correct tooth-shape all the way into the spaces between the teeth; therefore, it is advantageous to cut each gear with an addendum equal to the standard dedendum. After the original errors of tooth-spacing, tooth-shape, and eccentricity have been removed by the correcting process, the tips of the teeth of the desired gear can be removed, for example by grinding, in order to establish the standard addendum.

The amount of material that it is necessary to lap off or otherwise remove from each gear in order to correct all errors of the three types depends upon the accuracy of the original gear-cutting machine and must be determined by trials. When the gears are cut on any of the more accurate machines now in use, it is unlikely that more than about a thousandth of an inch will have to be removed at any one point on the curved tooth surface of the gear. If the now generally preferred pressure angle of 20 degrees is used, this means that in most cases the gear must have between five thousandths and twenty thousandths of an inch of excess pitch diameter to be removed by the lapping process. For gears of 14½ degrees pressure angle a greater allowance is required. The smaller gears in each set of four should be cut oversize by slightly greater amounts, since they will be reduced in diameter more rapidly than the others. It is desirable to have all the gears in the set brought down to very nearly the correct pitch diameters for their numbers of teeth at the time the action is stopped.

Because of the substantial reduction in the pitch diameter of the gears during the lapping process, it is advantageous to employ a cutter that produces initially a dedendum greater than the standard amount; this avoids having the tips of the teeth of all the gears lapped away too rapidly.

It may readily be seen by a study of FIGURE 2 that as the gears rotate in mesh with each other, contact between the tips of the teeth and the mating teeth is maintained longer than contact between the tips of one set of teeth and the bottom parts of the mating teeth. Because of this, the lapping process tends slowly to increase the pressure angle of the gears. As long as the thickness of material removed from the teeth during the correcting process is a small fraction of the spacing of the teeth, this change in the pressure angle is too small to be significant for most gear applications. When the process is applied to gears of large diameter having fine teeth, however, the change of pressure angle may be greater than is allowable. In such cases, and in any case in which it is necessary to have exactly the standard pressure angle, it is necessary to cut the gears with a special hob or cutter made with a pressure angle smaller than the angle desired in the finished highly accurate gear. This allowance must be determined by experiment.

Because lapping is a slow operation, especially when a fine grade of abrasive must be used in order to produce an extremely smooth finish, times of the order of several hours are required to produce gears of the highest accuracy by this method. The lapping procedure, therefore, is not an efficient means of producing gears in quantity; it is justified only when gears of the very highest standard of accuracy are required, since this order of accuracy cannot be obtained in any other known way.

The second mode of application of my invention overcomes this disadvantage, and provides an efficient way of producing in quantity gears that are only a little less accurate than the gears produced by lapping. In order to apply this method we first prepare a set of four broad faced gears, making these gears preferably of a grade of tool steel that can be heat treated to produce a high degree of hardness without serious distortion. The teeth of these gears are hobbed or shaped while the metal is soft, and they are then hardened. After hardening, the gears are subjected to an efficient stress relieving procedure, such as repeated cycles of alternate exposure to extreme cold and to heat just below the point at which hardness would begin to be lost. Following this stabilizing process process the center holes of the gears should be ground to make them truly cylindrical and to bring them to diameters that will fit the bearing pins of the machine shown in FIGURE 1 or that shown in FIGURE 4 or other machine that provides the same basic functions. The fit of the holes in the gears over these pins should be within a few ten-thousandths of an inch so that when the gears are rotating on the pins, the oil films in the bearings will keep the gears centered to an even higher degree of accuracy.

Having been prepared in this way the four gears should be lapped together according to the procedures given above until all unevenness of running has disappeared and all four of the gears have been brought very close to the pitch diameters that are theoretically correct for their numbers of teeth. In this instance all four of the gears are needed.

Figure 8:
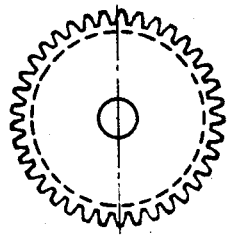
FIGURES 8 and 8A show how a gear may be gashed in order to cause it to operate as a shaving cutter for the second mode of operation of my invention.

When the lapping process has been carried to the proper point, any three of the gears are removed, mounted on true running arbors in a cylindrical grinding machine, and gashed in the manner shown in FIGURE 8, the tool for this purpose being preferably either a diamond-charged metal saw or a thin rubber-based abrasive wheel. The width of the slots thus ground through the teeth of the gears may be of the order of a sixteenth of an inch. The appropriate spacing depends on the pitch of the gear teeth but it is preferably equal to or greater than twice the width of the slots. The precise spacing is not important and, in fact, it is almost essential that the spacing of the slots be not regular but varying in a random manner; such irregularity of spacing is conducive to the smoothest cutting action.

When the three years have been thus prepared by grinding into each of them a series of slots extending to a depth a little below the bottoms of the teeth, they should be put back into the lapping machine with the fourth or unslotted gear. The unslotted gear should be on the support that is fitted with the drive to rotate the gears as, for example, the support 23 shown in FIGURE 1. The gears should then be lapped again for a short time under light pressure with a very fine grade of abrasive. The purpose of this added lapping operation is to remove burrs and to produce the sharpest possible cutting edges.

Having prepared the three shaving cutters in this way we can remove the middle one of them, leaving in place the two that are on the shafts that have vertical oscillatory motion, and we can then place in the train a new gear made of some softer material such as unhardened steel or bronze, cut somewhat oversize to allow for the correcting process. We are then ready to operate the mechanism in a manner such that this new gear is rapidly made very nearly as accurate as the three hardened gears and at the same time reduced to the desired pitch diameter. The new gear may have any number of teeth within the range of sizes that can be physically accommodated by the machine.

When using the machine in this way, we flood the gears with lubricant not containing any lapping compound and we operate it with a high rotational speed of the gears and a high rate of oscillation of the two gears that have cutting edges. The adjustment of the springs 50 in the mechanism shown in FIGURE 1, or the adjustment of fluid pressure in the system connected to the cylinders 174 in the mechanism of FIGURE 4, must be such as to give a moderately high pressure between the gears. The cutting action in this type of operation depends on the hardened teeth of the shaving cutter gears being pressed against the new gear with enough force to deform the surface slightly; the portions of metal that are thus caused to protrude into the slots of the cutters are shaved off by the sharp cutting edges. The chips so produced are very much smaller than the chips formed in ordinary machine processes, so that a finely finished surface is produced on the teeth of the new gear, but the rate of removal of metal is nevertheless very much faster than in the lapping process.

The corrective action exerted on the new gear in this system takes place exactly in the manner described in connection with FIGURE 2 when it was assumed that gears 2, 3 and 4 were perfect gears. In this case we are able to use three gears that are very nearly perfect, so that the errors of the new fourth gear are corrected rapidly.

Because we are using three gears all of which are free from errors of tooth-spacing, we are not restricted in this process of gear-shaving to operating only on gears that that numbers of teeth that would be suitable for use with these three gears in the lapping process. We can use the three very nearly perfect gears to correct *any* gear of the same pitch and pressure angle and, in the case of helical gears, of the same helix angle, over a wide range of sizes. If the new gear happens to have a number of teeth that has factors common to it and the numbers of teeth on one or more of the three accurate gears, this does no harm for the reason that during the entire process the accurate gears cut away the inaccuracies of the new gear but the new gear has no appreciable action on the accurate gears, and therefore cannot impose its inaccuracies on them, as can happen in the lapping process if a particular angular relationship of two of the gears repeats itself at frequent intervals.

The third of the slotted gears should be used in a regular program of exchanges to make working pairs with the other two slotted gears; in this way the life of the set of cutter gears is extended.

In order to operate this shaving process successfully, it is necessary to avoid having any of the chips formed by the cutting action lodging on or clinging to any part of the meshing surface of any of the gear-teeth, since such a chip would displace the gears in the same way as an inaccuracy in the gear and would cause the removal from the new gear of metal which ought not to be cut away. To remove all chips from the system as fast as they are formed, it is desirable to provide several jets such as 62 in FIGURE 1 or 181 in FIGURE 4 to project filtered cutting lubricant under high pressure against the gears. These jets should be directed in such a way as to carry the chips away from the points at which the teeth of the hardened accurate gears are entering into mesh as they rotate. Since the chips are formed within the transverse slots in the shaving cutter gears, it is not difficult to dislodge them by streams of lubricant under pressure and to carry them away without giving them any opportunity to adhere to the faces of the gear-teeth.

In my description up to this point and in the figures used to illustrate my invention, I have assumed that the gears always rotate on stationary tightly fitting shafts, since this arrangement is necessary in order to obtain the highest degree of concentricity in the corrected gears. When the mechanism is used to correct large numbers of gears by the shaving process, however, it will sometimes be advantageous to provide one of the supports with a rotatable shaft, mounted in an accurate bearing, which shaft may have special fittings, such as a collet, in order to facilitate the rapid mounting and unmounting of the new gears. Such a shaft or mounting device always introduces a small amount of eccentricity, but for many purposes the accuracy that is attainable is entirely satisfactory, while the saving of time in the operation of the machine is important. The three hardened gears, two of which are slotted, should, however, rotate on stationary shafts lubricated by oil under pressure, since it is undesirable to have any avoidable eccentricity in their rotation.

In describing the process of gear shaving in accordance with my invention, I have up to this point described a preferred method of operation which tends to produce good results in the most efficient way. It should be pointed out, however, that two variations of this procedure are possible within the scope of my invention.

The first of these variations, which allows a slight simplification of the mechanism, consists in imparting vertical reciprocatory motion to only one shaft, this being the one which carries the gear that is being corrected. Since the only cutting actions that the are required are those between this gear and the two gears which have cutting edges, these being the two gears with which the new or "desired" gear is in mesh, this arrangement will give the same cutting action as if the two cutters are moved against the (vertically) stationary gear being corrected. The arrangement has a disadvantage, however, in the fact that when there is no relative motion in the axial direction between the two cutter gears and the hardened highly accurate gear with which they both mesh, there is little tendency to wear down and eliminate any tiny particles of foreign matter, such as dust particles or chips resulting from the cutting action at the new gear. Such particles will inevitably find their way between the hardened gears from time to time. When the cutter gears are moved to produce the cutting action, there is a definite tendency to eliminate interfering particles, and therefore this arrangement is to be preferred as tending to give more accurate results.

The second variation consists in the use of only one gear having cutting edges, the other two hardened accurate gears being left with normal teeth. It will be clear to anyone who has understood the principle of my invention that as long as three of the four gears in the train are of high accuracy the progressive correction of inaccuracies of tooth-spacing will take place even if only one of the two gears with which the originally inaccurate gear is in mesh is enabled to remove material from it. In this case either the cutter or the gear being corrected may be given the reciprocating motion in the axal direction.

This second variation of the gear-shaving procedure has little to recommend it other than the fact that it can be used as an expedient when only one gear with cutting teeth is available. Obviously the rate of production of corrected gears is substantially greater when two cutter gears are used in the train.

The *third* mode of employment of my invention requires the same basic supporting and actuating mechanism (as shown in FIGURE 1 or FIGURE 4) and the same slotted cutters as are used for the gear shaving operation. In this case, however, these cutters are used to generate a new gear.

Figure 9:
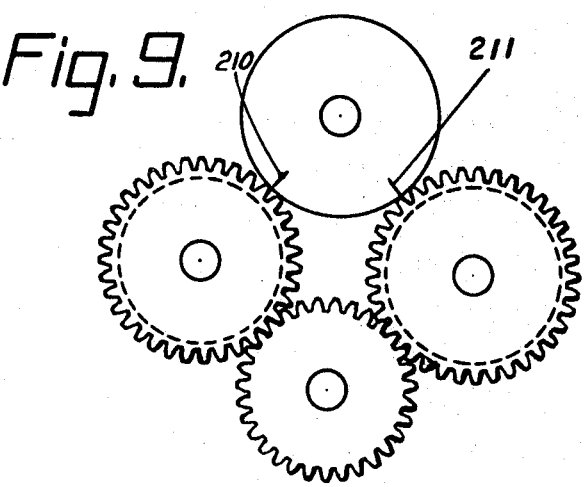
FIGURE 9 shows three gears, at least one of which must have cutting edges such as are illustrated in FIGURE 8, in combination with a gear blank from which a gear is to be generated in accordance with the third mode of employment of my invention.
Figure 8A:
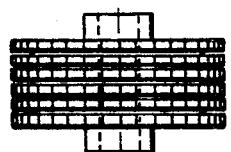

If, as is shown in FIGURE 9, we have three extremely accurate gears at least one of which has been slotted to provide it with cutting edges, and if we place in contact with these gears a circular blank having the proper outside diameter to produce a gear of any arbitrarily chosen number of teeth, we can cause the slotted gear or gears to cut accurate teeth on the blank, provided that we start the operation correctly.

If, referring to FIGURE 9, we number the gears 2, 3 and 4 for identification, reserving the number 1 for the gear blank, the essential requirement for correct starting of the operation may be stated in this way. The distance measured around the circumference of the gear blank 1 between any one of the teeth of gear No. 2 that is in contact with 1 and any one of the teeth of gear No. 4 that is also in contact with the gear blank 1, must be equal to the distance spanned by an integral number of the tips of the teeth that are ultimately to be cut on blank 1. This setting must be made closley enough that after the mechanism has been running for a few seconds the tips of the teeth on gear No. 4 will be falling into the small notches cut by the tips of the teeth of gear No. 2, assuming that the gears rotate so that the teeth on the shorter arc of the gear blank 1 travel from gear 2 to gear 4. At the same time cuts made by the tips of the teeth of gear No. 4, after they have traveled around the larger part of the circumference must arrive in such a way that the tips of the teeth of gear No. 2 fall into them. If these conditions are reasonably well fulfilled at the start, the supports of all the gears will automatically be moved slowly during the operation of the machine in such a way as to satisfy these mating conditions more accurately, and after a short time the tips of the teeth of gears 2 and 4 will be securely meshed with a set of notches in the blank 1 deep enough to act in the same way as gear-teeth in maintaining the positions of the four axes of rotation. From this stage to the completion of the gear from the blank, all that has to be done is to allow the machine to run long enough to remove the necessary amount of material from the gear blank 1; when the new gear reaches the desired pitch diameter, it will necessarily be correct in tooth-spacing, tooth-form, and concentricity, as will be clear to anyone who has understood the foregoing explanation of my invention.

Perhaps the simplest way of positioning the three gears and the uncut blank so as to obtain the starting condition described above is to calculate the angle occupied on the new gear by an integral number of teeth suitable for spanning the space between a selected pair of teeth on the two adjacent gears, preferably teeth which will initially touch the blank almost perpendicularly, and to mark this angle by two radial marks, such as 210 and 211 in FIGURE 9, on the upper face of the gear blank. For this purpose we may conveniently use an accurate protractor or a dividing head or rotary table. The supports of all the gears can then be adjusted so that the tips of the teeth on the cutter gears coincide with these marks as shown in FIGURE 9. When this has been done, the machine can be started, and the new gear will be generated correctly.

Since the cutting action of the slotted gears in this third mode of employment of my invention is much less rapid than the cutting action in a gear-hobber or gear-shaper, this method of generating gear-teeth is somewhat costly. It is useful principally for the production of gears that cannot be made on the usually available gear-cutting machines. This includes gears having odd numbers of teeth greater than about 129 and prime numbers of teeth greater than 127, since the sets of change gears usually available do not permit the cutting of these gears. This application of my invention is by no means a trivial one, since many applications exist in which gears having large odd numbers and especially prime numbers of teeth are useful.

The fourth mode of employment of my invention, as hereinabove stated, is in the process known as gear-burnishing. In the prior art, hardened gears of higher than usual accuracy, especially with respect to the smooth finish of their teeth, are rotated in tight mesh with gears produced by the normal processes of hobbing or shaping in order to impress their own superior tooth-form on the gears being processed. Since it is necessary to press the gears together with considerable force, it is usual to employ three or four hardened gears symmetrically arranged about the gear that is being burnished; this creates a balance of forces that makes it much easier to operate on gears which have shafts or center holes of only moderate sizes. The hardened burnisher gears can easily be provided with large shafts which can withstand the pressures required for the process. In these prior art arrangements the hardened burnisher gears have no connection with each other, and the process has little effect in improving the accuracy of the gears subjected to it with respect to their errors of tooth-spacing.

Figure 12:
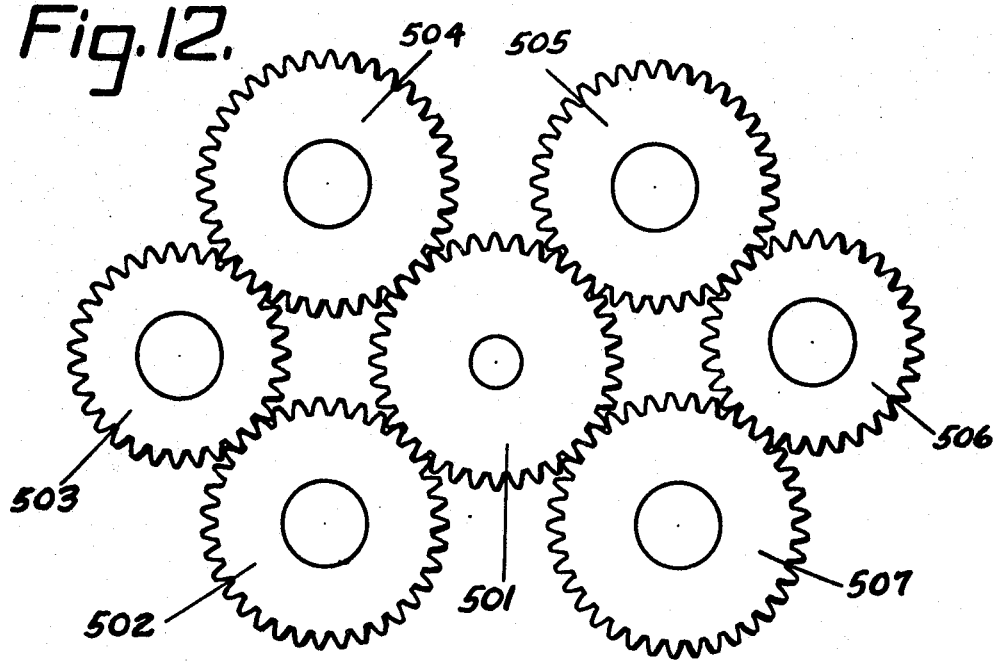
FIGURE 12 shows an arrangement of seven gears forming two closed trains in which one gear is common to both trains. This arrangement of gears is of particular utility in the art of gear burnishing, this being the fourth mode of employment of my invention.
Figure 13:
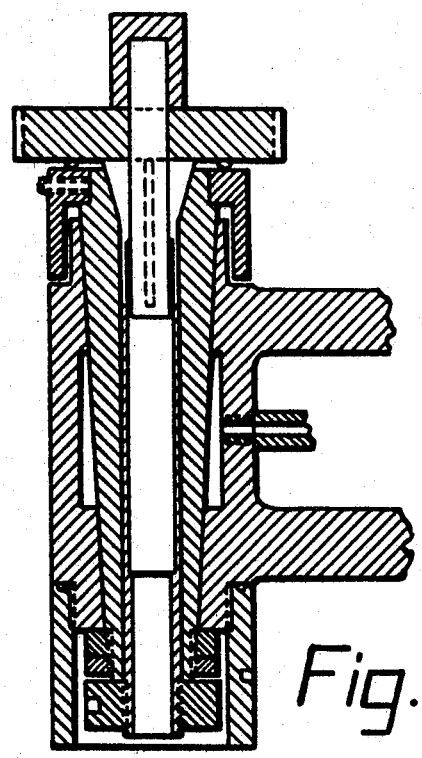
FIGURE 13 is a sectional view of the draw-in collet.

FIGURE 12 shows how six hardened gears, which have been made accurate by the lapping process which I have above described, can be employed to burnish a seventh softer gear in such a way as to improve its uniformity of tooth-spacing and the smoothness and correctness of its tooth-shape at the same time. The seven gears are arranged to form two closed trains. 501, 502, 503, 504, and 501, 505, 506, 507, in which the gear 501, which is the gear to be corrected is common to the two trains. The other six gears are made of hardened tool steel or of even harder material such as tungsten carbide, and they must have been lapped previously in the apparatus shown in FIGURE 1 or in that shown in FIGURE 4, or in an equivalent mechanism, until they run smoothly in a condition of tight mesh.

Gears 502, 503, 504, 505, 506 and 507 can be supported individually on massive blocks such as are shown in FIGURE 1, or they may be mounted on arms of the kind shown in FIGURE 4. In either case the supporting shaft is preferably made large, and the supporting structure rigid and strong. In accordance with what I have taught in connection with FIGURES 1 and 4, the supports of the shafts on which the six accurate gears are mounted must be made firm enough that they will move only slowly even under pressures great enough to bring about the burnishing action on the central gear 501, but at the same time they must be capable of lateral movements as well as movements toward the interiors of the closed gear trains with which they are associated so that under inwardly directed pressures they will move to bring the shafts into the positions that are required for tightly meshed closed four-gear trains.

These pressures must be directed as follows: On gear 502, toward gear 504; on gear 503 toward gear 501; on gear 504 toward gear 502; on gear 505 toward gear 507; on gear 506 toward gear 501; on gear 507 toward gear 505. The support of the shaft of gear 501 may appropriately be fixed. The shaft on which gear 501 rotates can be of normal size, since the pressures on gear 501 are approximately symmetrically placed and balanced. Any one of the seven gears may be driven in rotation; all of the others will rotate with it.

This burnishing arrangement will correct errors of tooth-spacing by displacing the metal on the faces of teeth that are incorrectly located for the same reason that this same metal would be shaved off in the four-gear gear-shaving operation previously explained, provided only that the required displacement is not so great that teeth are broken off. In most cases the required correction is small enough to be compatible with the displacement of metal that takes place in the normal burnishing process.

A gear that has been burnished by the method shown in FIGURE 12 will operate with unusual freedom from noise and vibration. Much of the noise generated by the operation of gear-trains produced by the methods of the prior art is due to imperfections of tooth-shape, but an appreciable amount of such noise is also caused by the clashing of the gears which results from the constant slight accelerating and decelerating of the load caused by the inequalities of spacing of the gear-teeth. Since these inequalities of tooth-spacing are largely removed by gear-burnishing in accordance with my invention, this second source of noise is greatly reduced at the same time that the tooth-shape is improved and the tooth-surfaces made smooth.

As in the employment of the method of my invention for gear-shaving, this method of gear-burnishing is not limited to gears having any definite relation of size to the hardened burnishing gears in the system. Since these six gears are substantially perfect they can be used to correct the errors of newly cut gears over a wide range of numbers of teeth.

While various methods and apparatus have been described heretofore to improve the accuracy of gears as by, for example, burnishing, abrading, lapping, etc., it is to be understood that the invention is directed to all types of cold shaping operations in which metal is removed, deformed and/or both, and the term "cold shaping" as hereinafter employed is intended to generically include all such processes as were heretofore specified by name and all other analogous processes.

While preferred forms and arrangement of parts have been shown in illustrating my invention, it is to be clearly understood that various changes in details and arrangement of parts may be made without departing from the spirit and scope of the invention as defined in the appended claimed subject matter.

What is claimed is:

1. A mechanism for improving the accuracy of gears of the type having the pitch lines of their teeth located on right-circular cylinders comprising a plurality of shafts adapted to have toothed gears mounted for meshed rotation in the form of a closed train, means supporting the shafts with the axes thereof in generally spaced parallel relationship to each other, means for imparting movement to at least three of said shafts individually and independently of each other in directions normal to the axes of said shafts to bring gears carried thereby into meshed relationship, and means for rotating at least one of said shafts whereby the meshed gear teeth are cold shaped to virtually eliminate errors in tooth-spacing, tooth-form and eccentricity.

2. The mechanism as defined in claim 1 including force-exerting means operatively connected to each of the movable shafts to apply to each individually and independently of each other a force in the direction of shaft movement to position the gears in progressively tighter meshed relationship.

3. The mechanism as defined in claim 1 including force-exerting means operatively connected to each of the movable shafts to apply to each individually and independently of each other a force in the direction of shaft movement to position the gears in progressively tighter meshed relationship, and means for adjusting the force-exerting means to selectively apply a desired force to the meshed gears through each of the shafts individually.

4. The mechanism as defined in claim 1 wherein means are provided for reciprocating at least one of said shafts in a direction parallel to its axis.

5. The mechanism as defined in claim 1 including force-exerting means operatively connected to each of the movable shafts to apply to each a force in the direction of shaft movement to position the gears in progressively tighter meshed relationship, and means for adjusting the force-exerting means to apply a desired force to the meshed gears.

6. A mechanism for improving the accuracy of gears of the type having the pitch lines of their teeth located on right-circular cylinders comprising a plurality of shafts adapted to have toothed gears mounted for meshed rotation in the form of a closed train, means supporting the shafts with the axes thereof in generally spaced parallel relationship to each other, means for imparting movement to at least three of said shafts individually and independently of each other in directions normal to the axes of said shafts to bring gears carried thereby into meshed relationship, means for imparting rotation to the gears whereby the meshed gear teeth are cold shaped to virtually eliminate errors in tooth-spacing, tooth-form and eccentricity, and force-exerting means operatively connected to each of the movable shafts to apply to each a force for forcefully urging the gears into progressively tighter meshed relationship.

7. The mechanism as defined in claim 6 including means for restraining the movement of at least one of said shafts away from another of said shafts under the influence of forces developed during the cold-shaping of the gears.

8. The mechanism as defined in claim 6 including means for restraining the movement of at least one of said shafts away from another of said shafts under the influence of forces developed during the cold-shaping of the gears, and said restraining means are masses substantially greater than the combined masses of the shafts and gears.

9. The mechanism as defined in claim 6 including means for restraining the movement of at least one of said shafts away from another of said shafts under the influence of forces developed during the cold-shaping of the gears, and said restraining means are layers of viscous fluid associated with the shaft supporting means whereby forces developed during the cold-shaping of the gears must overcome mass-inertial reactions and viscous frictional resistance in order to move the supporting means.

10. The mechanism as defined in claim 6 including another plurality of shafts adapted to have other toothed gears mounted for meshed rotation, and said other toothed gears defining with a gear of said first-mentioned closed train a second closed train whereby said rotation imparting means effects rotation of said other toothed gears and the cold-shaping thereof.

11. The mechanism as defined in claim 6 wherein said movement imparting means includes piston-cylinder means coupled to said at least three shafts for imparting movement thereto.

12. The mechanism as defined in claim 6 wherein said at least three shafts are supported by pivot means, and said movement imparting means are coupled to said pivot means for moving said shafts in a direction to bring the gears carried thereby into meshed relationship.

13. The mechanism as defined in claim 6 including means for disengaging the meshed gears, means for rotating at least one of said gears relative to another of said gears, and means for reengaging said gears.

14. A method of improving the accuracy of gears of the type having the pitch lines of their teeth located on right-circular cylinders comprising the steps of placing a plurality of toothed gears in mesh to form a closed train, rotating the gears, and moving at least three of said gears individually and independently of each other toward a point within the closed train whereby the meshed teeth are cold shaped to virtually eliminate errors in tooth-spacing, tooth-form and eccentricity.

15. The method of improving the accuracy of gears as defined in claim 14 wherein the plurality of gears have a different number of teeth.

16. The method of improving the accuracy of gears as defined in claim 14 including the step of progressively forcefully moving the gears into tighter mesh as the cold shaping operation proceeds.

17. The method of improving the accuracy of gears as defined in claim 14 wherein the plurality of gears have a different number of teeth, and no two of the different numbers of teeth have common factors other than unity.

18. The method of improving the accuracy of gears as defined in claim 14 including the step of disengaging the gears, and again reengaging the gears in different angular positions with respect to each other as compared with the angular positions of the gears prior to the disengagement thereof.

19. The method of improving the accuracy of gears as defined in claim 14 including the step of reciprocating at least one of the gears in a direction parallel to the axis of rotation thereof.

20. The method of improving the accuracy of gears as defined in claim 14 wherein the plurality of gears are defined by at least four gears, a first of the gears being in mesh with second and third gears and the latter two gears being in turn meshed with a fourth gear thereby forming the closed train, the second, third and fourth gears being of high accuracy, while the first gear is of a relatively low accuracy, rotating the gears, and producing relative motion between the gears in a direction parallel to the axes of rotation thereof.

References Cited
UNITED STATES PATENTS

| | | | |
|---|---|---|---|
| 1,080,505 | 12/1913 | Aichele | 51—287 |
| 1,562,438 | 11/1925 | Copland | 51—287 |
| 1,630,845 | 5/1927 | Hoke | 51—26 |
| 1,884,292 | 10/1932 | Schurr | 51—26 |
| 1,948,071 | 2/1934 | Holmann et al. | 51—26 |
| 2,036,246 | 4/1936 | Wills | 51—26 |
| 2,123,026 | 7/1938 | Simmons | 90—1.6 |
| 2,325,237 | 7/1943 | Falk | 51—287 X |
| 2,364,947 | 12/1944 | Christman | 90—1.6 |
| 2,423,593 | 7/1947 | Gasser | 51—287 |
| 2,658,259 | 11/1953 | Aldino et al. | 51—26 X |
| 2,990,658 | 7/1961 | Praeg et al. | 51—105 |

LESTER M. SWINGLE, *Primary Examiner.*